US010872266B1

(12) United States Patent
Binford

(10) Patent No.: US 10,872,266 B1
(45) Date of Patent: Dec. 22, 2020

(54) HANDWRITING RECOGNITION SYSTEMS AND METHODS

(71) Applicant: Read-Ink Corporation, Cupertino, CA (US)

(72) Inventor: Thomas O Binford, Cupertino, CA (US)

(73) Assignee: Read-Ink Corporation, Cupertino, CA (US)

( * ) Notice: Subject to any disclaimer, the term of this patent is extended or adjusted under 35 U.S.C. 154(b) by 0 days.

(21) Appl. No.: 16/925,099

(22) Filed: Jul. 9, 2020

Related U.S. Application Data

(62) Division of application No. 16/419,635, filed on May 22, 2019.

(51) Int. Cl.
| | | |
|---|---|---|
| *G06K 9/00* | (2006.01) | |
| *G06K 9/62* | (2006.01) | |
| *G06T 7/60* | (2017.01) | |
| *G06K 9/72* | (2006.01) | |
| *G06K 9/34* | (2006.01) | |
| *G06K 9/46* | (2006.01) | |

(52) U.S. Cl.
CPC ....... *G06K 9/6202* (2013.01); *G06K 9/00416* (2013.01); *G06K 9/00422* (2013.01); *G06K 9/344* (2013.01); *G06K 9/4604* (2013.01); *G06K 9/469* (2013.01); *G06K 9/723* (2013.01); *G06T 7/60* (2013.01); *G06K 2209/01* (2013.01); *G06T 2207/30176* (2013.01)

(58) Field of Classification Search
CPC .......... G06K 9/00; G06K 9/202; G06K 9/222; G06K 9/2011; G06K 9/72; G06K 9/48; G06K 9/4604; G06K 9/643; G06K 9/52; G06K 9/6202; H04N 7/26643; G06T 7/60
See application file for complete search history.

(56) References Cited

U.S. PATENT DOCUMENTS

| | | | | |
|---|---|---|---|---|
| 5,644,652 A * | 7/1997 | Bellegarda | ........... | G06K 9/6297 382/186 |
| 5,768,420 A * | 6/1998 | Brown | ....................... | G06K 9/52 382/159 |
| 5,933,525 A * | 8/1999 | Makhoul | ............ | G06K 9/00879 382/185 |
| 6,891,971 B2 * | 5/2005 | Loudon | ................... | G06K 9/342 382/186 |
| 6,968,083 B2 * | 11/2005 | Williams | ................ | G06K 9/222 382/187 |
| 7,336,827 B2 * | 2/2008 | Geiger | ............... | G06K 9/00872 382/177 |
| 7,359,551 B2 * | 4/2008 | Napper | ................. | G06K 9/6814 382/186 |
| 7,460,712 B2 * | 12/2008 | Thiesson | ................ | G06K 9/222 382/187 |
| 8,005,294 B2 * | 8/2011 | Kundu | ............... | G06K 9/00865 382/159 |
| 8,615,131 B2 * | 12/2013 | El-Sana | ............. | G06K 9/00402 382/189 |

(Continued)

*Primary Examiner* — Amir Alavi
(74) *Attorney, Agent, or Firm* — Edward B. Weller

(57) ABSTRACT

Systems and methods are provided for handwriting recognition. Handwriting data is received. Geometric data of text in handwriting data is determined. Sub-characters of the text are determined. Sub-characters of text are matched to a model. Most probable characters of the text are determined based on the matching.

1 Claim, 13 Drawing Sheets

1000

(56) References Cited

U.S. PATENT DOCUMENTS

| | | | | |
|---|---|---|---|---|
| 9,298,365 | B2* | 3/2016 | Takasugi | G06F 3/018 |
| 9,418,281 | B2* | 8/2016 | Rowley | G06K 9/00402 |
| 9,465,985 | B2* | 10/2016 | Xia | G06F 40/166 |
| 9,495,620 | B2* | 11/2016 | Dolfing | G06K 9/00979 |
| 9,740,925 | B2* | 8/2017 | Haji | G06K 9/00879 |
| 10,055,659 | B2* | 8/2018 | Elarian | G06K 9/6226 |
| 2012/0287089 | A1* | 11/2012 | Shiota | G06K 9/222 |
| | | | | 345/179 |

* cited by examiner

HANDWRITING RECOGNITION SYSTEMS AND METHODS

RELATED APPLICATION

This application is a divisional of U.S. patent application Ser. No. 16/419,635, filed May 22, 2019, which is incorporated by reference herein in its entirety.

BACKGROUND

The present disclosure relates to computer automated handwriting recognition systems and methods.

Unless otherwise indicated herein, the approaches described in this section are not admitted to be prior art by inclusion in this section.

Handwriting recognition has been a difficult problem for a long time, like speech recognition, for similar reasons. A major difficulty of handwriting recognition is the large variation in writing, both for a single writer and from writer to writer. For a single writer, variation is high within a single document and under varying conditions, for example, between a comfortable seated writing position and a standing strained position. Significant variation occurs with informal writing, when hurried, with too much coffee, with shifting position of the hand across the page, with interruptions and other effects. The form of characters depends on characters that precede and follow, called coarticulation.

Between writers there is enormous variation. A major problem is the multi-writer problem. For cell phones, quick training for the owner's individual writing is enough. However, in important applications, e.g., postal address reading, banking or kiosks, and data entry from forms, recognition must function for many people without training.

Humans readers depend on context in important ways, some available for use by machine reading. Some forms of context are currently difficult for machines, like linguistic semantic context. The accuracy of human reading of handwriting depends heavily on the quality of handwriting, and on the words, phrases, and sentences in which the characters are embedded. Human accuracy depends strongly on understanding handwriting, i.e., reading the handwriting. Handwritten characters in nonsense "words" can be illegible for human readers. Experiments show about 4% character error rate for handwritten characters in nonsense words, without lexical context. Some writers were better; some readers were better. Automated recognition of handwriting can also make use of limited understanding, using dictionaries and spell checking. It may not be practical yet to use grammar and semantics in handwriting recognition programs, nor is artificial intelligence sufficiently advanced to use knowledge that a human being might routinely use in deciphering bad handwriting. Writing is often used to communicate to oneself with brief careless notes as reminders. In such cases, the human who wrote the message has a big advantage over computers.

Handwriting recognition software converts character symbols to symbolic character codes (e.g., ASCII (American Standard Code for Information Interchange), Unicode, etc.) that can be manipulated in a word processor, printed, or used in databases and in artificial intelligence programs. Transforming the handwriting signal to text symbols has proven to be difficult.

Various handwriting recognition software programs are available. Some commercially available products have reasonable apparent performance with lexical correction, but they have some problems without lexical correction. In many scenarios, lexicons are inadequate. Some examples are proper nouns, foreign words (writers of non-English languages), words with no unique English transliteration, non-standard words and abbreviations, severe misspellings. Obtaining estimates of the accuracy of these commercial systems is difficult. The software error rate depends heavily on cooperative writers and on the lexicon. An average character error rate of 1% (recognition rate of 99%) is generally considered to be necessary for acceptance by users. In addition, recognition in real time is often desired.

There are a lot of symbols that may need to be recognized. For example, there are more than 100 characters and symbols in English in large block caps, small block caps, printed lower characters, cursive lower characters, and cursive caps. Most of these characters have several or many variants in handwriting, typical or rare. Other languages written with Roman script have diacritics. Machine print has many fonts, corresponding to thousands of visually distinct symbols. Also there are about 100 widely used symbols including punctuation, usual ASCII symbols #@!~%^&*( )-+, currency symbols: $, etc. There are many mathematical symbols. There are many emoticons. All these total a large number, perhaps 5,000 symbols or more for a single script. Devanagari, an Indic script, has about 450 symbols.

The large number of symbols raises problems. Each handwritten symbol has at least one model, and often has several variants. First, the error rate increases with the number of models; thus the accuracy has to increase from that accuracy required to discriminate a small number of characters symbols, say 26, to compensate for the total symbol set. Second, the computational complexity of recognition increases with the number of models.

Typical recognition is based on multi-template matching, i.e., matching fixed models with instances. In this paradigm, recognition is matching against all models. This method has high computational complexity. Methods using neural nets or using parameterized models with estimation of parameters approximate these thousands of variants.

Even with these methods, there will be new, previously unknown variants. They might be from writers from a different country, e.g., English writers from India. Abilities to learn models of new variants is necessary. These capabilities are necessary for learning a script for a multi-script system.

It is desirable that a handwriting recognition system be functional on a smartphone, and have low power consumption. Computational complexity is a challenge for power consumption. Thus, it would be desirable to have a computationally efficient mechanism for computer automated handwriting recognition systems and methods.

Character correction of text is painfully slow, for humans for either handwriting or keyboards. High accuracy is a goal, both for human-interface and low power consumption.

SUMMARY

The present disclosure includes techniques pertaining to handwriting recognition systems and methods. In one embodiment, a method for recognizing handwriting is described. The method comprises receiving handwriting data; determining geometric data of text in handwriting data; determining sub-characters of the text; matching sub-characters of text to a model; and determining most probable characters of the text based on said matching.

In one embodiment, determining geometric data in handwritten text comprises estimating extrinsic geometry of text defined by a translation and a rotation of a local portion of a line of the received handwriting data by estimating baseline of text (including tilt) from line segments that are estimated tangent to pairs of y-infima of character strokes and tangent to collinear triplets from y-infima.

In one embodiment, determining geometric data of text in handwriting data includes determining intrinsic geometry of the handwritten text defined by size and shape of characters and sub-characters. Determining intrinsic geometry of the handwritten text defined by size and shape of characters and sub-characters comprises estimating slant angle of the text relative to the baseline based on a local estimate of skew of circles and straight lines; estimating waist, ascender, and descender lines parallel to the baseline in lowercase text, or caps line in block caps text; and estimating these lines parallel to the baseline at the local optimal robust least squares estimate of y-suprema and y-infima of the strokes that are estimates of the local averages of these lines.

In one embodiment, determining sub-characters of the text comprises determining sub-characters based on ovals, loops, retraces, lobes, and sticks; separating stroke segments from sequences of blended strokes; estimating these separate stroke segments pairwise at natural transitions based on the sub-character components; and representing the geometric data of sub-characters as free knot splines parameterized by arc length, with spiral bases with C2 continuity at knots, and with C0 continuity at discontinuities.

In one embodiment matching sub-characters of text to a model comprises mapping the model to character instances by curves, pairs of curves, and pairs of pairs of curves, mapping structured models of characters composed of sub-characters; and representing the mapped sub-characters and characters as a directed acyclic graph (DAG).

In one embodiment, matching sub-characters of text to a model comprises estimating empirical conditional probability P(d|h) of data based on hypothesis from order statistics of a parameter; using signed functional distance that is not scalar; and estimating non-parameterized empirical probability over stratified character and sub-character populations. Here, P(d|h) is conditional probability of data d given hypothesis h, a standard probability estimate.

In one embodiment, estimating most probable characters of the text based on the said matching comprises estimating k-best character probabilities from k-best graph search (A*) of a directed acyclic graph the DAG of alternative sub-character and character log probabilities of multiple character hypotheses.

In one embodiment, the method further comprises initializing parameters of handwriting geometry based on a handful of characters, such as two characters, of text in the received handwriting data; and adapting to the strata of the current document sub-character geometry over the course of analysis of the document. Individual writers have few strata, and there are few strata across all writers.

In one embodiment, the model includes co-articulation of every pair of characters to make use of their orthographic evidence to reduce their variance.

In one embodiment, the method further comprises estimating the probability of a pair or tuple of received characters based on sub-word (sub-lexical) linguistic evidence of graphemes, syllables and subsyllables, and affixes.

In some embodiments, the disclosure provides for a non-transitory computer-readable storage medium storing instructions for handwriting recognition. The instructions when executed by one or more processors cause the one or more processors to perform steps comprising receiving handwriting data; determining geometric data of text in handwriting data; determining sub-characters of the text; matching sub-characters of text to a model; and determining most probable characters of the text based on said matching.

In some embodiments, the disclosure provides for a computer system for handwriting recognition, the computer system comprising: one or more computer processors; and one or more non-transitory computer-readable storage media, the storage media storing computer program instructions executable by the one or more computer processors to perform steps comprising receiving handwriting data; determining geometric data of text in handwriting data; determining sub-characters of the text; matching sub-characters of text to a model; and determining most probable characters of the text based on said matching.

In some embodiments, the one or more programs comprise instructions for performing the methods described herein.

The following detailed description and accompanying drawings provide a better understanding of the nature and advantages of the present disclosure.

DETAILED DESCRIPTION

Figure 1:
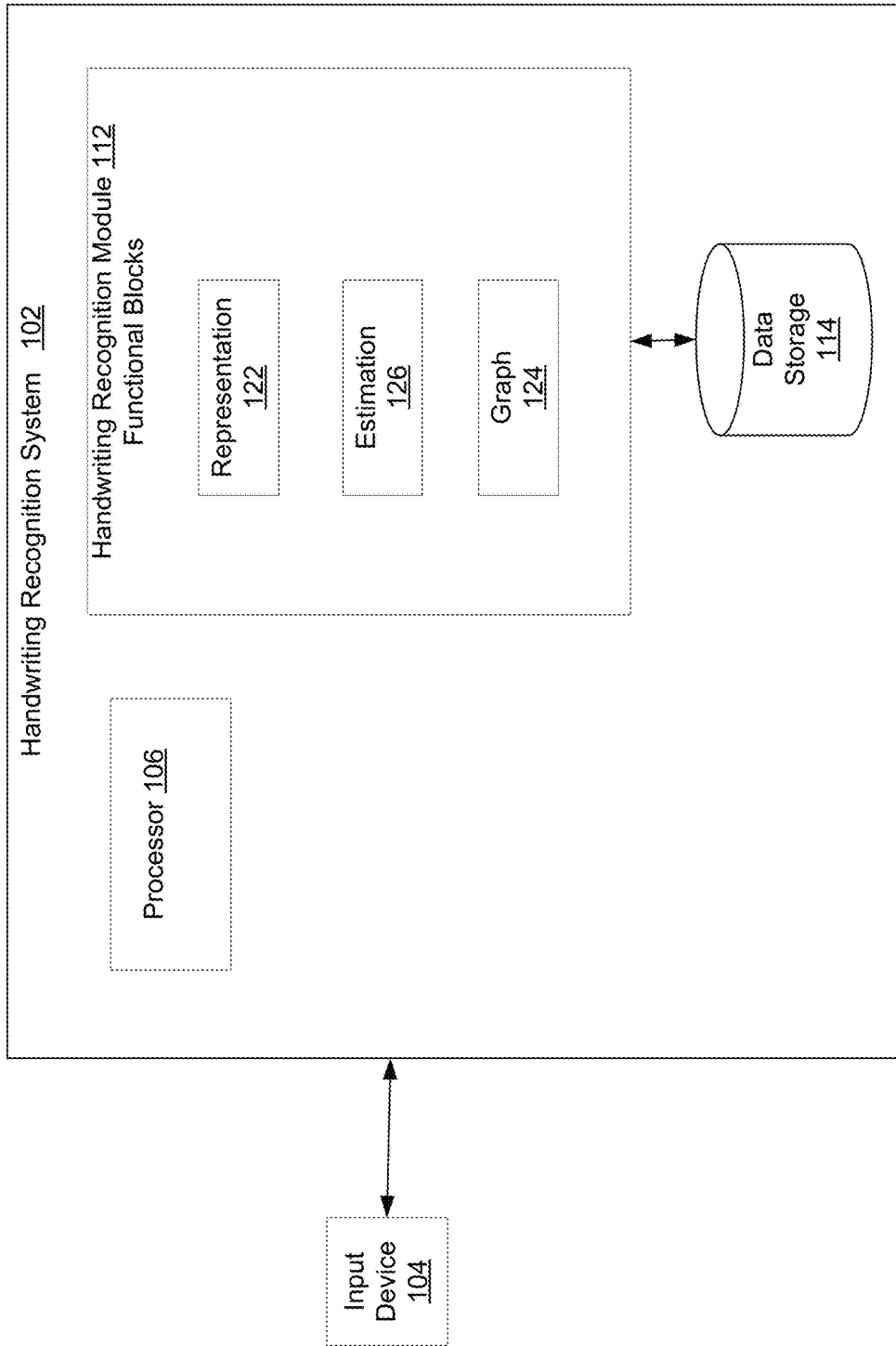
FIG. 1 illustrates an architectural block diagram of a computer automated handwriting recognition system according to some embodiments.

Described herein is a handwriting recognition system that enables a computer to transform real-world handwriting data into character codes that can be manipulated or used by other computer programs. There is an enormous amount of handwritten data which is practically accessible only with human effort. Examples of handwriting data are handwritten land records, mail addresses, birth records, and death records.

Overview

Described herein are techniques for handwriting recognition systems and methods.

This section is organized as follows. First, a very broad overview of the modules in the sequence of execution is presented. Following this, a roadmap that describes the motivation and implementation for each of these is described. Finally, each of these modules is described in detail.

The order of execution of the modules is now described.

Estimate a baseline (the imaginary line over which lines of text seem to be written), and scales (typical size of writing). This is the estimation of the scale and the extrinsic geometry.

Estimate support. Decompose input into stroke segments (there are a small number of distinct stroke segment shapes that are combined in different ways to form the entire character set). Stroke segments are represented as splines parameterized by arc length with free knots with spiral bases. Functional representation and functional distances are used to define probabilities. The motivation for estimating support is to minimize variance, i.e., maximize accuracy. Functional representation and functional distance are used as terms for curve representation and curve distance for intuition and simplicity, in spite of differences that are minor in this implementation.

To estimate probabilities of these stroke segments, their combinations as sub-characters, and ultimately characters, empirical non-parametric probability distributions are used. Since there are many variations in writing over the populations of writers, the distributions are stratified. Similar writings of sub-characters are grouped into a class (stratum) and probabilities are estimated within strata to minimize the error in the probability estimate.

Make character hypotheses. Estimate probabilities for each hypothesis by combining the sub-character probabilities as above. The hypotheses are organized on a graph.

Combine these orthographic probabilities estimated from geometry with probabilities of linguistic components, sub-words, i.e., graphemes, syllable components, and affixes.

A graph traversal identifies the top few high probability paths (words). This character graph also defines a set of character probabilities that are used in a standard search of the lexicon using edit distance. Combine orthographic, sub-word, and word probabilities.

Adapt to the current writer and if useful, form a distinct stratum for the current writer. Strata are assumed to be systematically discriminable.

This concludes a description of the main steps involved in the execution path from the input to the output.

Next some goals for the system to be useful to users are described. Then design motivations/decisions and conceptualizations that enable these goals to be realized are briefly described. This is also a roadmap for the rest of the detailed description.

Figure 2:
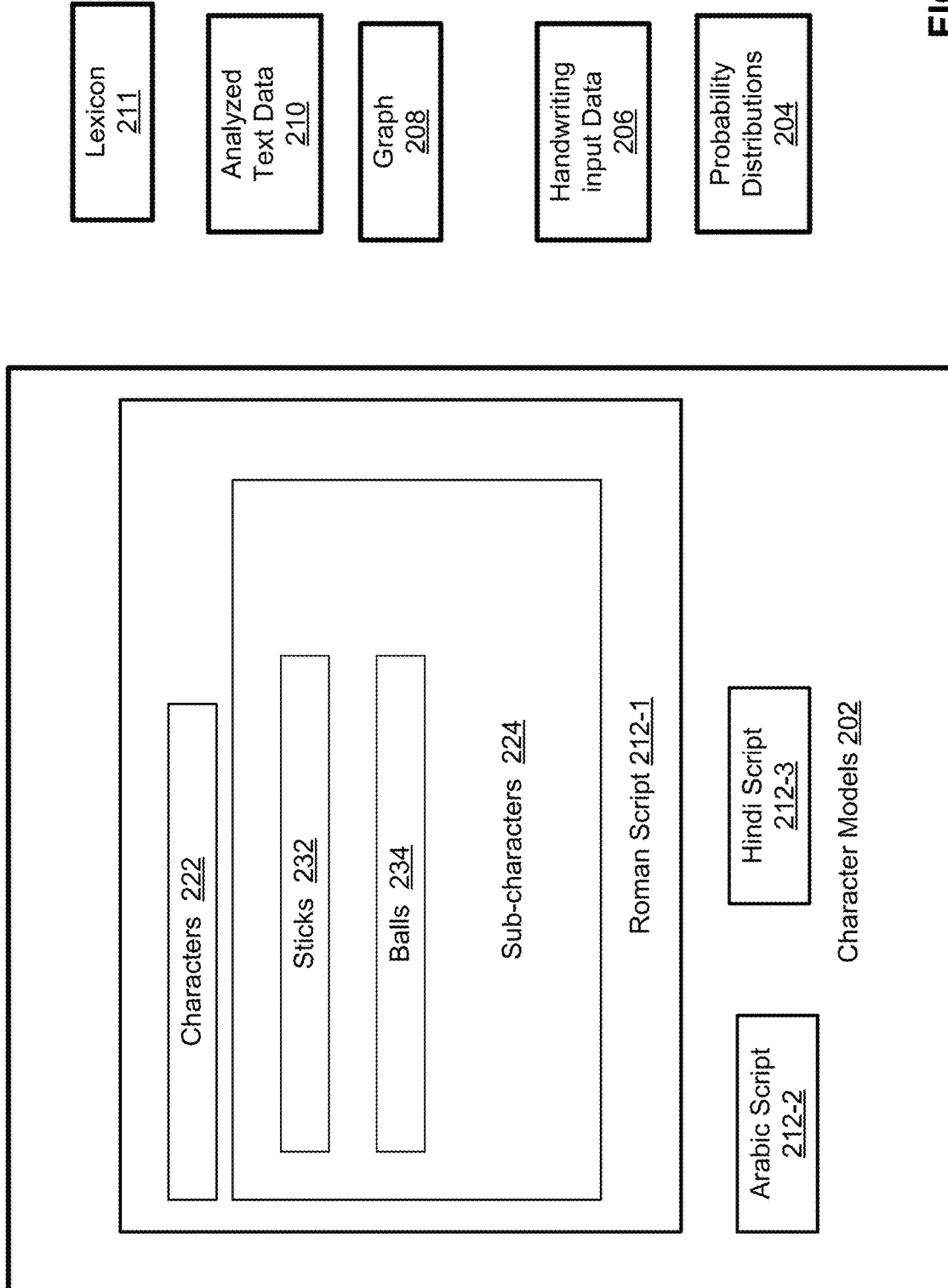
FIG. 2 illustrates a data store of the handwriting recognition system of FIG. 1 according to some embodiments.

FIG. 1 illustrates an architectural block diagram of a handwriting recognition system 100 according to some embodiments. Handwriting recognition system 102 comprises a handwriting recognition module 112, a processor 106 for executing handwriting recognition module 112, and a data storage 114. FIG. 2 illustrates a data store 114 of the handwriting recognition system 100 according to some embodiments. Data store 114 comprises character models 202, a probability distributions data store 204, a handwriting input data store 206, a graph data store 208, an analyzed text data store 210, and a lexicon data store 211. These elements of system 100 are described in more detail after an overview of the system 100.

In some embodiments, the handwriting recognition system 100 is designed for high accuracy, a word recognition rate estimated to be 99.9% with lexical correction, (three nines) i.e., a word error rate of 0.1% lexically corrected, combining handwriting evidence (orthographic) with lexical correction using a large lexicon of about 100,000 words. Using only orthographic evidence, the equivalent character error rate is estimated to be 2%. The state of the art in handwriting recognition is word recognition, not identification of individual characters. In the state of the art, word recognition depends on moderate character accuracy and correction based on a large lexicon. The system 100 aims to outperform the state of the art in character recognition, aiming for a character recognition accuracy close to the limit of the data, competitive with human character accuracy (experiments show about 4% human character error rate for handwritten characters without lexical context, as mentioned above). The system 100 is designed for a flexibility of recognition based on adaptation to new symbols in their context. Orthographic accuracy is particularly relevant for free forms where significant parts of text do not occur in lexicons. The system 100 embodies mappings that strengthen performance on machine print. Current OCR systems (for machine print) have surprisingly low performance; they have problems with small quality defects (paper aging, minor problems in scanning).

In some embodiments, the handwriting recognition system 100 is designed for high speed execution estimated at about 100 characters per second on a single processor on a desktop computer and about 10 characters per second on a single processor on a smartphone. Power consumption is correspondingly low, which is beneficial for cell phone use. These rates are much faster than real-time handwriting, which is typically about ½ second per character, with many pauses.

Mathematical representation of the geometric models of characters is the foundation for this program that estimates the probability of instances of characters from their models.

Mathematical representation of the geometry of characters is a composite (part-whole) representation of simple geometries of sub-characters. E.g., the letters 'h' and 'n' are composed of a 'vertical stick' followed by a 'lobe' from bottom to top to bottom (base to waist to base).

Sub-characters are specified by estimating the parameters of their geometric representations; i.e., estimating the location and orientation of the lines of text (extrinsic geometry), and the size and shape of the sub-characters, i.e., structure (intrinsic geometry).

Geometric Models are the basis for learning and recognizing characters. For example, a letter '0' could be modeled as a circle or an ellipse, and a letter 'V' could be described as a pair of lines converging at the baseline.

Representations are typically parameterized to accommodate variation.

Representation is the basis for hypothesizing equivalence (e.g., two fonts, two instances of the letter 'a', or shared sub-characters). Characters that share sub-characters (e.g., second parts of the letters 'h' and 'n') are thought of as members of a character class. The system 100 enumerates the alphabet by enumerating character classes to increase generalization and reduce computational complexity. This is the basis for simplifying concepts in programming.

A wide range of scripts can be composed from shared basic observable geometric elements. Much of this design carries over from Roman script to other scripts. The system 100 is AI based (Artificial Intelligence), model-based, using deep structural models.

Figure 3:
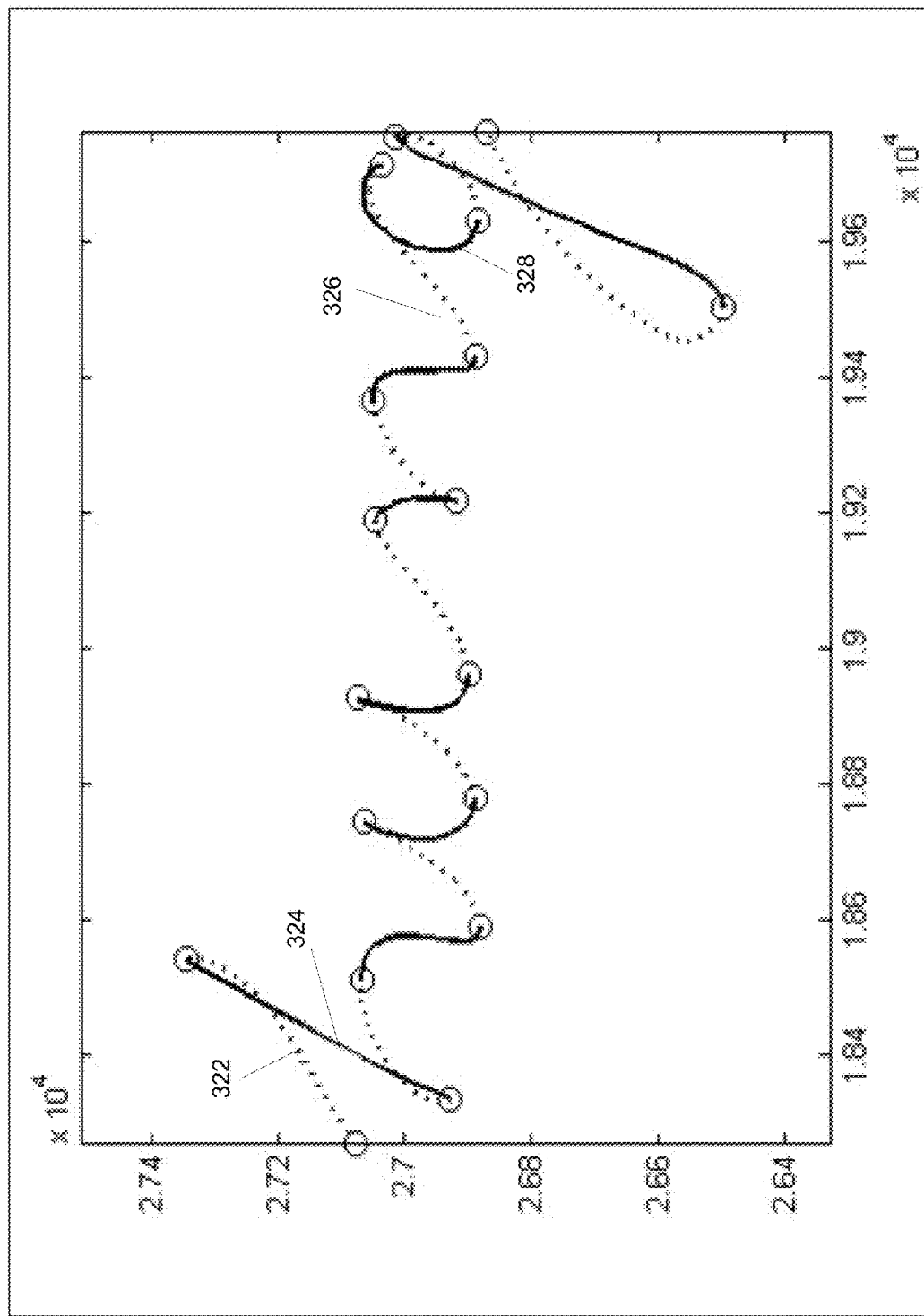
FIG. 3 is a diagram illustrating an example handwriting with y-stroke segments according to some embodiments.

A matter of terminology: The system 100 estimates stroke segments and extended stroke segments. This decomposition into stroke segments is based on the primitive motions of writing. The system 100 estimates different types of stroke segments—for example, y-stroke segments are estimated between two successive y-extrema, x-stroke segments are estimated between two successive x-extrema. For example, a printed 'v' has two y-stroke segments, one from top to bottom and the other from bottom to top. Similarly, a printed 'w' has 4 y-stroke segments. FIG. 3 is a diagram illustrating an example handwriting with y-stroke segments according to some embodiments. Segment 322 is a y-stroke segment that is from bottom to top, and segment 324 is a y-stroke segment that is written from top to bottom. Similarly, segment 326 is a y-stroke segment written from bottom to top and 328 is a y-stroke written from top to bottom. Strokes written from bottom to top (up-strokes) are shown as dotted curves in FIG. 3. Strokes written from top to bottom (down-strokes) are shown as solid curves in FIG. 3.

Figure 4:
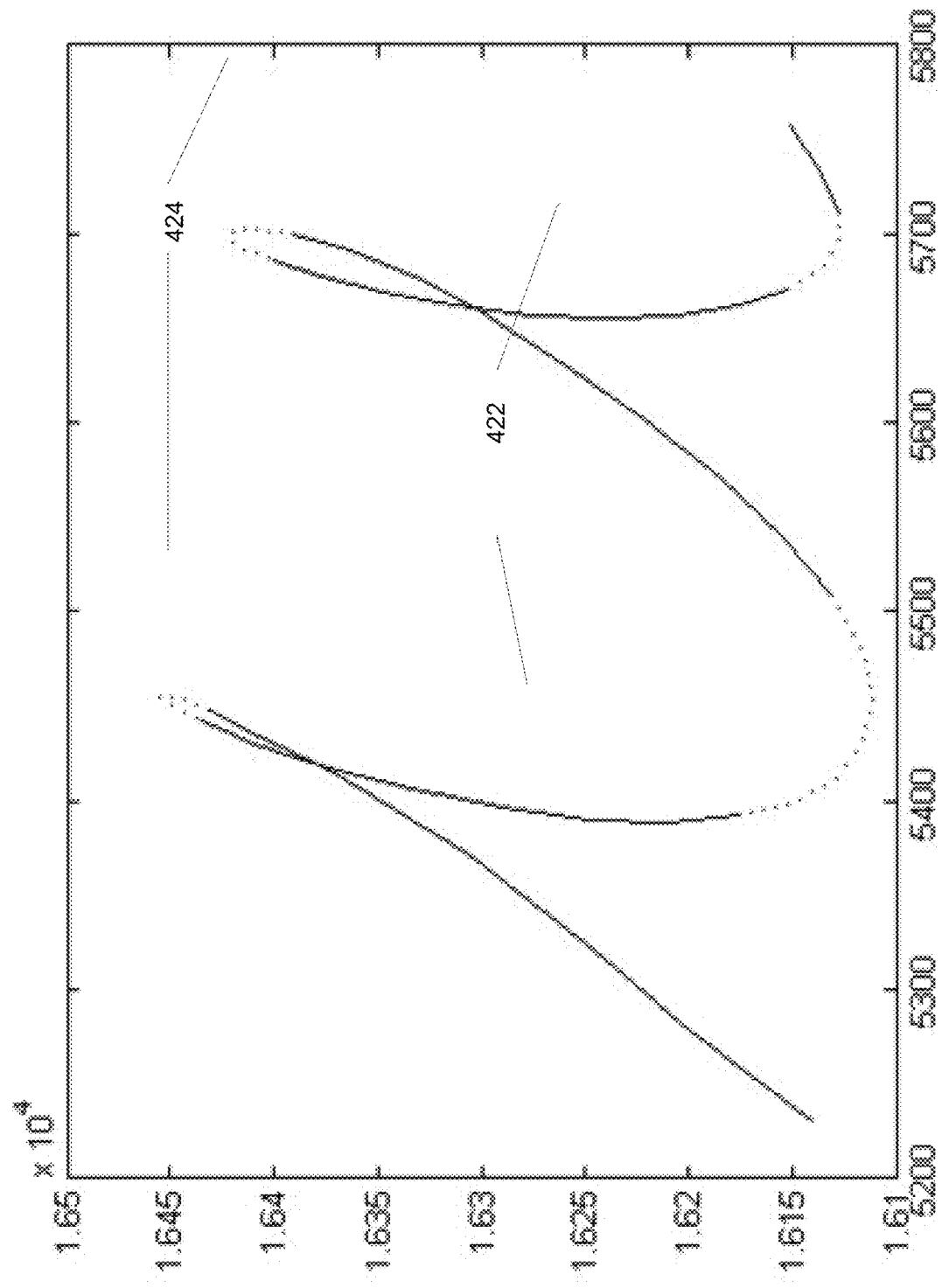
FIG. 4 is a diagram illustrating an example handwriting with blended stroke segments according to some embodiments.

In cursive or hand-printed writing, system 100 deals with blended stroke segments i.e., the writing transitions from the previous stroke segment into the current stroke segment and transitions from the current stroke segment into the following stroke segment. A segmentation estimates the constituent stroke segments, and the blend is also estimated. FIG. 4 is a diagram illustrating an example handwriting with blended stroke segments according to some embodiments. The solid curve segments 422 are the estimated y-stroke segments and the dotted curve segments 424 are the blending segments between the y-stroke segments.

Therefore, every stroke segment is associated with two other stroke segments-one before and one after. System 100 identifies variants caused by this blending, coarticulation. It is an effect at transitions between blended connected stroke segments, and sometimes a strong effect in cursive writing and printed lower case writing. In contrast, coarticulation is relatively weaker in block caps writing where stroke segments are separated. These are also referred to as separated character (printed lower case) and separated stroke handwriting (printed upper case).

Especially in cursive handwriting, a stroke segment transitions from the preceding stroke segment and transitions to the next stroke segment. Parameters of a stroke segment usually depend moderately on the preceding stroke segment and the following stroke segment.

Uncertainty is a huge challenge. In handwriting, uncertainties are at a scale where they matter i.e., they affect accuracy. Uncertainties should not be neglected. Variability introduces uncertainty. Three categories of variabilities affect handwriting recognition—variability in writing (by a writer or writers), variability in capturing the writing (digitizer and device measurement error), and variability in the analyses of the geometry and probability of that data (by a program).

The first uncertainty is the variation in handwriting across writers. Multiple samples of handwriting from a single writer also are uncertain. The system 100 has no control over writers. These data are technically called non-stationary data. A writer's intended characters and executed characters vary over short time intervals, for example, the height and straightness of −a'l', or the roundness of an 'o'. This happens for various reasons, perhaps aesthetic, for legibility, because of a tremor, or as the position of the hand changes across the page. Height, width, slant, tangent angle, and curvature are parameters used which are affected by the uncertainty. The system 100 addresses this uncertainty by adaptive methods and by the statistical distribution of measurements.

The capture of handwriting data introduces additional uncertainty. We have performed experiments on data captured from the Wacom Tablet (Intuos 103) which has a time resolution of 5 milliseconds, and a spatial resolution of 2 or 5 microns in different conditions. This device accuracy is reasonable. Improvements to the device accuracy would improve slightly our recognition accuracy.

Estimation of parameters, and estimation of probabilities given these parameters also have uncertainties, some from uncertain data and some from our algorithms. The data provides a lower limit on uncertainty, i.e., an upper limit on accuracy. The term estimation is used frequently, because all measured data and estimates derived from the data are uncertain.

In the following, the models might appear complicated (over complicated). These are intended to reduce the uncertainty introduced by the algorithms in dealing with uncertain data. The term variance reduction is used to refer to various algorithmic techniques to reduce the statistical variance of the estimates of the parameters and probabilities. Many of the estimation algorithms are accurate near the limits of the measured data as judged by the perceptual limits of the inventors.

Character instance refers to an individual character to be recognized in a document being analyzed.

Figure 9:
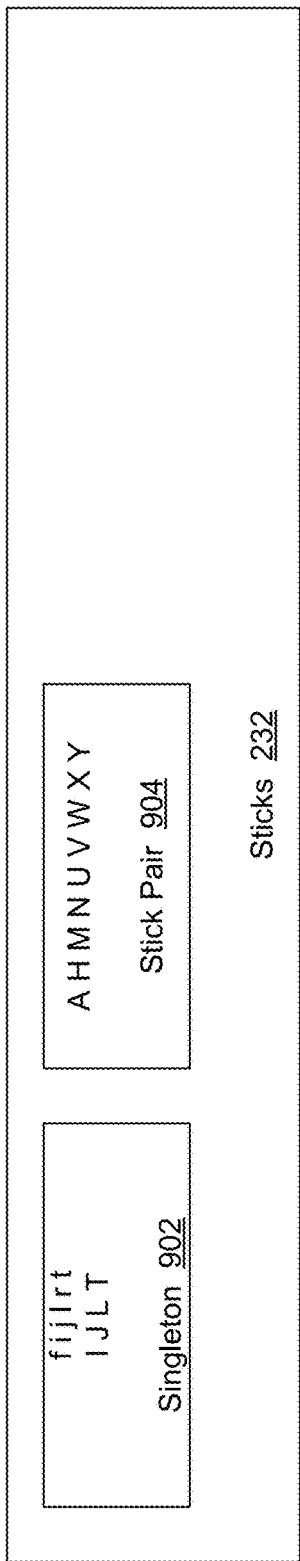
FIG. 9 is a diagram illustrating Roman script sub-characters according to some embodiments.
Figure 9:
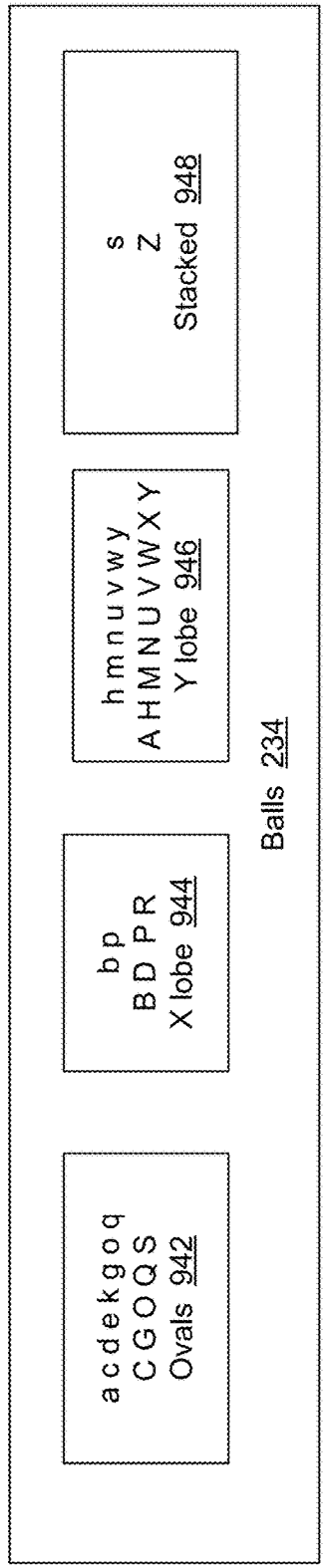
Figure 9:
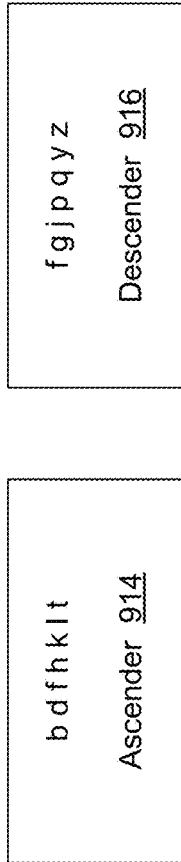
Figure 9:
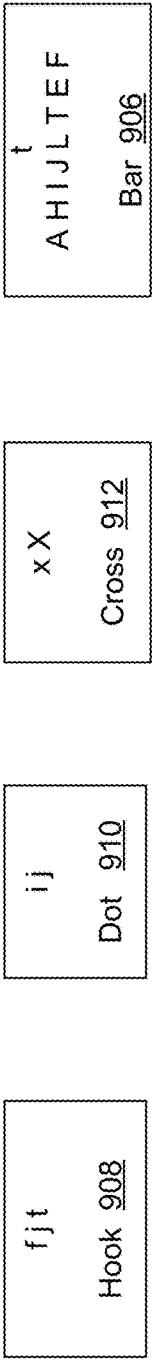
Figure 9:
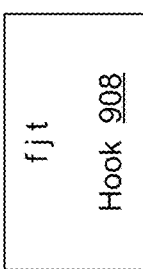
Figure 13:
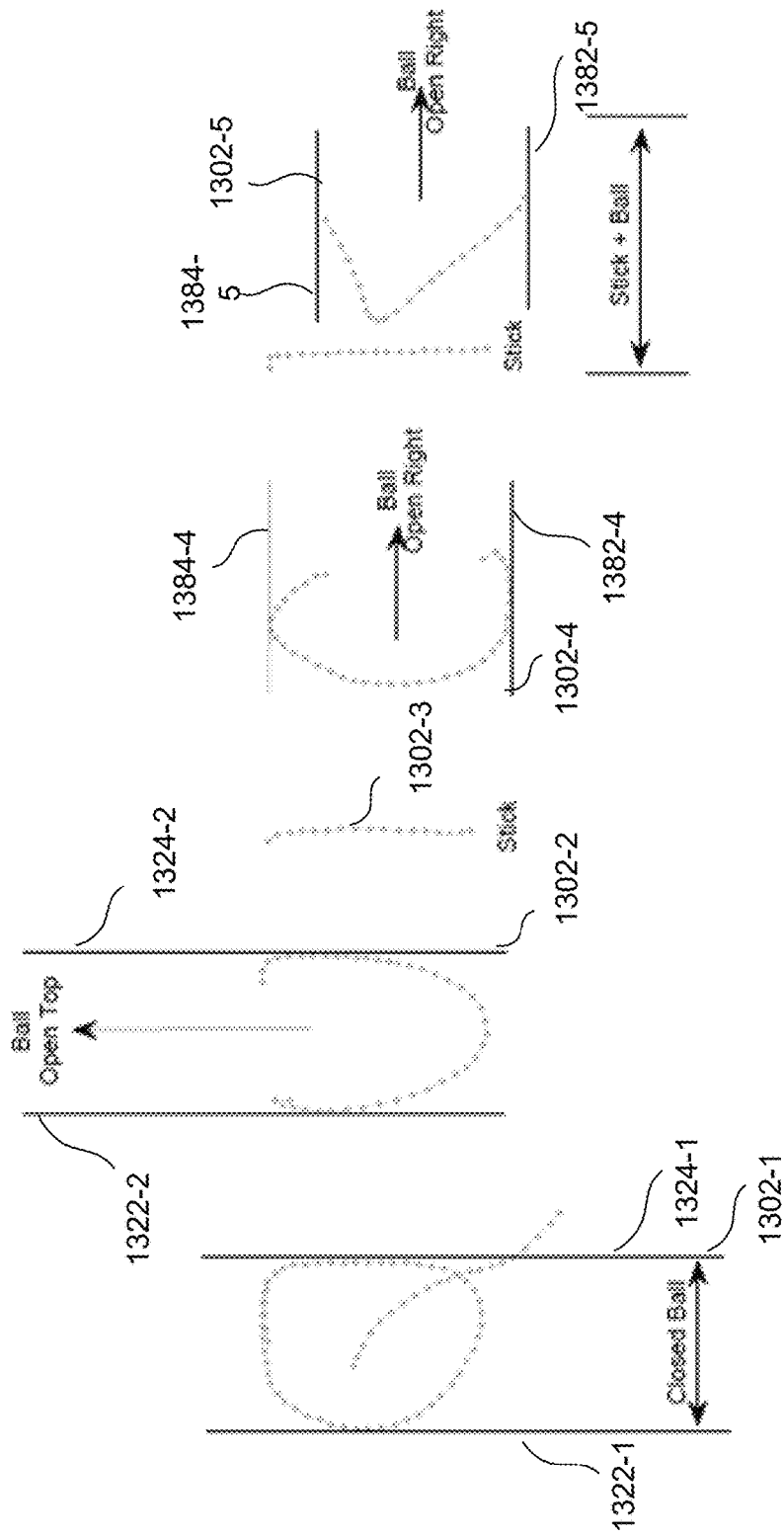
FIG. 13 is a diagram illustrating a classification of a word according to some embodiments.

Character models are composite geometric models. Character models model sub-populations of known characters (strata). Character models model distributions of their sub-characters by stratification and by parameterization. An advantage of a composite (part-whole) model is that there are few strata per character. Some in the handwriting recognition community have used part-whole models. Described herein is one particular implementation of character structure as stroke segment and pairs of stroke segments (sub-characters), i.e., curves and pairs of curves, i.e., "sticks" and "balls, terms are used informally for intuition, clarity, and convenience. The terms here sub-character, part, component, are equivalent. The handwriting characters are structures of sticks and balls, which are approximately straight stroke segments and approximately circular stroke segments that are one-dimensional curves and two-dimensional areas. FIG. 9 and FIG. 13 (described below) illustrate some examples of balls and sticks.

The system architecture is built around stroke segments and relations between stroke segments (pairs and triples of stroke segments) with the goal of modeling handwriting primitives, the natural components of characters i.e., the primitives used by writers. To be useful these primitives should be as stable and reproducible as possible. Primitives have proved to be consistent across writers and documents, and across styles of writing including cursive, printed lowercase, block caps, cursive caps, and fonts of machine print. The value the primitives contribute is the basis for isolating, i.e., unblending compounds of stroke segments. This segmentation is a major method of approximation theory to estimate curve structures accurately (i.e., variance reduction by support estimation).

Measurements are made over single stroke segments i.e., over one stroke segment and not over a mixture of stroke segments. Single stroke segments are simpler than mixtures of stroke segments, thus their parameters are estimated with greater accuracy i.e., smaller estimation errors (variance reduction). Measurements are also made to estimate the relation between pairs and triples of stroke segments, for example where one stroke segment lies with respect to another stroke segment. The system 100 computes probability of characters by combining the probabilities of their parts, i.e., sequence of stroke segments and relations between stroke segments. A goal of the system 100 is to recognize characters as accurately as possible. Achieving maximum recognition accuracy is impossible just as maximizing probability is impossible or minimizing variance is impossible. But approximate maximization is realizable. There are many unknowns and unknowables all of which contribute to estimation. Making good recognition is possible within the limits of the data and computational complexity and other uncertainty.

A principled way to achieve good recognition accuracy is to increase the probability of the true hypothesis (this simultaneously increases the discrimination of false hypotheses i.e., decreases their probability). Accurate character probabilities depend on accurate stroke segment parameter estimation, equivalent to low error estimation of parameters (low variance). An important method in approximation theory is accurate estimation of parameters dependent on estimating proper support. It is therefore desired to make estimates compounded over isolated stroke segments.

Characters are composed of curves. The digitizer (such as input device 104) records a sample of points. Curves are measured as aggregates of intervals between pairs of sample points. The system 100 analyzes the statistics of these curves directly using functional data analysis (curve data). This is distinct from analyzing the digitized points samples (scalars or vectors). Mathematically, these curves are 1-dimensional manifolds in 2-space ('x' and 'y'). We choose to work with arc length as a parameter, tangent-normal instead of x-y. The system 100 estimates probabilities defined by curve distances rather than Euclidean distances. These are accurate estimates.

As described above, the system 100 estimates a distance between two curves. These are functional or curve distances. This allows us to estimate the central value (mean) and the width (variance) for a population of curves. The system 100 can thus estimate a scaled distance of any curve from the central value (Mahalanobis distance). Distance estimation between curves (functions) is different conceptually and computationally from distances between points (scalars, or vectors in n-dimensions). The accurate estimation of the curve distance depends on the accurate estimation of the extent of the curves, i.e., the support of curve hypotheses. The distribution of inverse distances forms a distribution of probabilities. In some embodiments, the distributions are non-parametric. The probabilities are implemented as log probabilities. Log probabilities may be used to keep numerical values of probabilities within bounds of computer word length. Using log probabilities also allows multiplication of probabilities to be done by addition, which reduces the computational power and electrical power for the multiplication and in mobile devices, the reduced power increases battery life.

Figure 5:
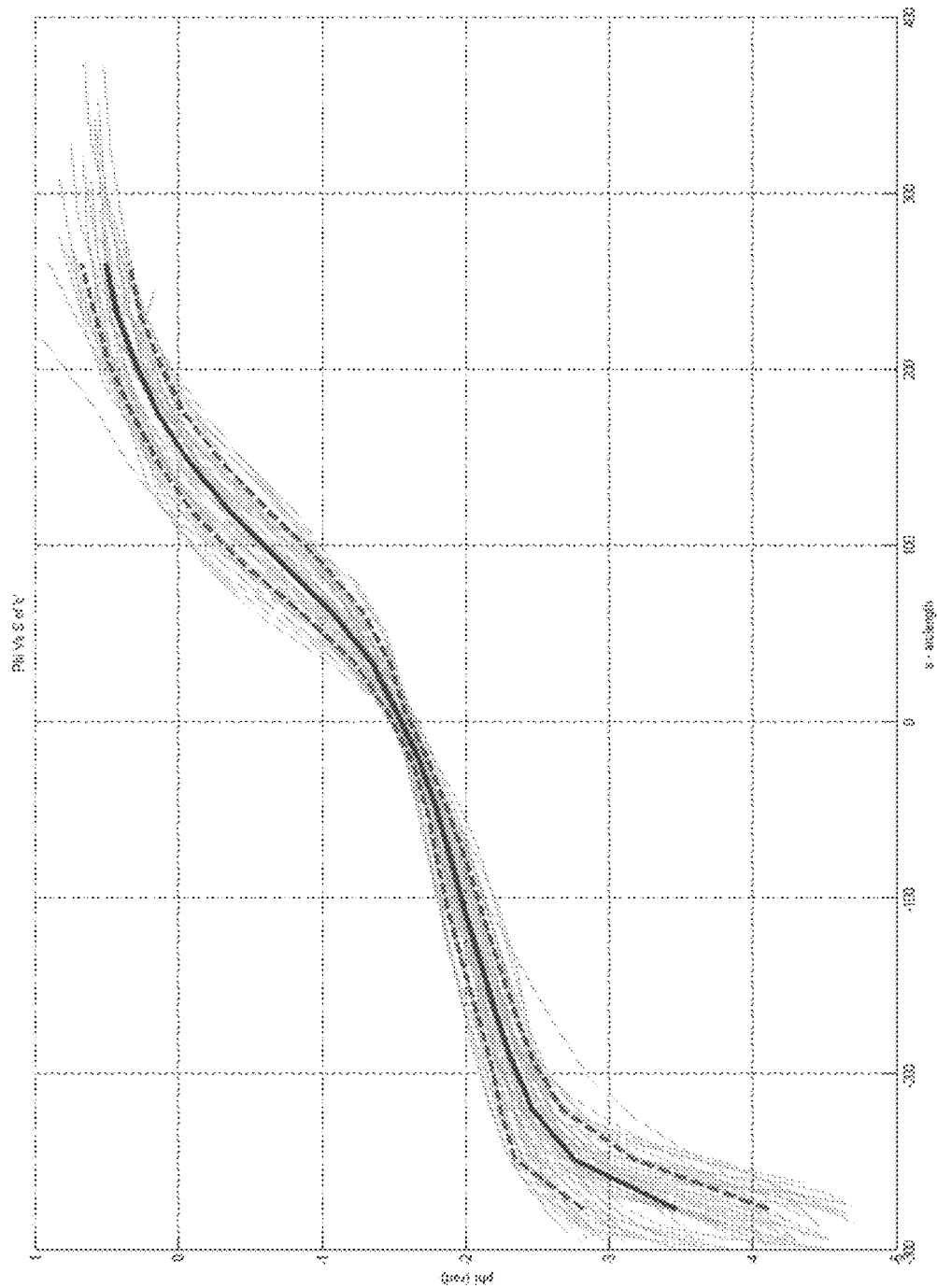
FIG. 5 is a diagram illustrating a population of curves and the functional or curve mean and standard deviation for that population according to some embodiments.

FIG. 5 illustrates a population of continuous curves. These curves represent the tangent angle of a population of the character 'c' parameterized by the arc length. The thick curve in the center represents the mean and the dotted curves depict the one standard deviation distance from the mean.

The character models and accurate estimation of support enable accurate estimation of probabilities of sub-character and character models. Character hypotheses are organized on a graph. A graph traversal identifies high probability paths (words).

The chain of ideas discussed in this map are: Mathematical representation of the geometry of characters, estimating extrinsic and intrinsic geometry of the writing, composite models/part-whole models (sub-characters), estimation based on this modeling, estimation of support, accurate estimation of parameters based on support (variance reduction), functional parameters, stratification, estimation of probabilities from stroke segments, pairs, and triples of stroke segments, comparing probabilities on the graph between character hypotheses (recognition). This concludes the map for this section. Details follow through to the end of this section.

Handwriting Recognition System

Referring again to FIG. 1, handwriting recognition system 100 is a mobile device, such as a mobile phone, a smart phone, or a tablet. Handwriting recognition system 100 comprises handwriting recognition system 102 and input device 104. Input device 104 may include a touch screen that generates an image of handwriting made on the touch screen with a stylus. Although handwriting recognition system 102 is shown for use in a mobile device, handwriting recognition system 102 may be used in other devices.

Handwriting recognition system 102 comprises a handwriting recognition module 112, a processor 106 for executing handwriting recognition module 112, and a data storage 114.

Handwriting recognition module 112 comprises a representation block 122, a parameter estimation block 126, and a graph block 124.

Handwriting recognition system 102 may recognize handwriting using online data and offline data. Online data may be received from, for example, cell phones, tablets, and other devices, in real-time. In some embodiments, online handwriting has input recorded from an electronic pen or similar device as a series of points sampled along the path with time. Offline data may be received images from, for example, cameras and scanners that have scanned images from paper. The offline data may include text from forms, populations of which typically will be a large number of writers with a small sample from each writer.

Handwriting recognition system 102 may recognize handwriting and machine print. For ease of discussion, the term "handwriting" is used to describe printed lower case handwriting, cursive handwriting, block capitals handwriting, and machine print with multiple possible fonts unless otherwise described. Handwriting recognition system 102 may recognize the handwriting from multiple writers, multiple printers and multiple languages and alphabets. For ease of discussion, handwriting recognition system 102 is described for Roman script and English language. There are more than 50 languages that use Roman script. In some embodiments, the system 100 functions for multiple scripts.

Extrinsic Geometry

The external geometry of characters is next described.

Figure 6:
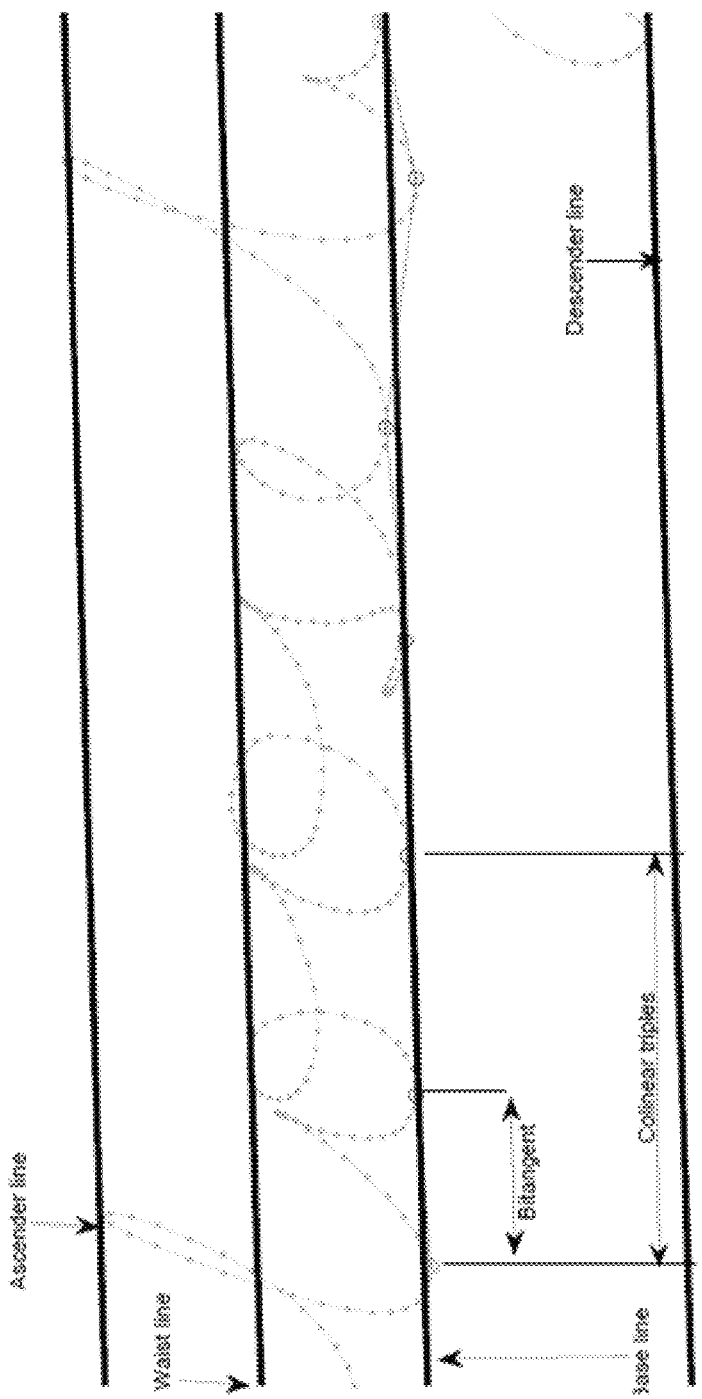
FIG. 6 is a diagram illustrating external geometry for upwardly sloped writing according to some embodiments.
Figure 7:
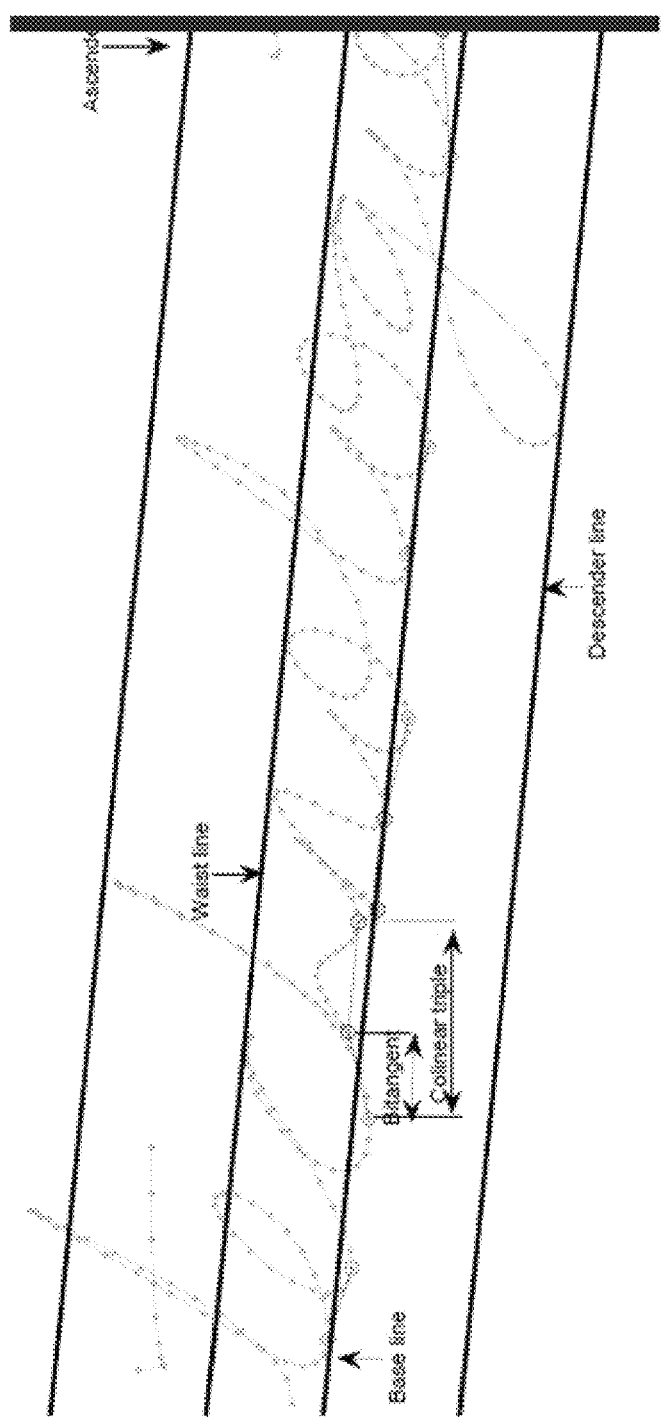
FIG. 7 is a diagram illustrating external geometry for downwardly sloped writing according to some embodiments.

FIG. 6 is a diagram illustrating external geometry for upwardly sloped writing (upward tilt) according to some embodiments. FIG. 7 is a diagram illustrating external geometry for downwardly sloped writing (downward tilt) according to some embodiments.

In various embodiments, handwriting recognition module 112 estimates baseline, waistline, scale, and tilt.

Tilt is the angle of the baseline with respect to the horizontal of the document.

Handwriting recognition module 112 determines the baseline and the tilt for cursive writing and printed lower case, and estimates the waistline, ascender heights and descender depths. For block caps, measurements refer to baseline and caps line. These provide the layout of the writing and scales of the characters.

Lower case characters have minima of two sorts—those at the baseline, and those on descender stroke segments. FIG. 6 and FIG. 7 show some examples of base and descender stroke segments. Lower case cursive characters 'fgjpqyz' contain descender stroke segments. There are also a small number of y-infima well above the baseline for oval characters, 'acdgoq' and for characters with ligature waist 'bovw'. These y-infima are typically separable from baseline y-infima and do not affect robust estimate of baseline.

Lower case characters have maxima of two sorts—those at the waistline, and those with ascender stroke segments. FIG. 6 and FIG. 7 show some examples of waist and ascender stroke segments. Lower case characters 'bdfhklt' contain ascender stroke segments.

A baseline is a local line for the lower point of the bottom of base characters in lower and upper case writing. In some embodiments, handwriting recognition module 112 estimates the baseline by mutual tangents (bi-tangent) to the stroke segments at the minima of the two stroke segments. Baseline estimation has been a problem that this method solves well. The use of mutual tangent (bi-tangent) for estimating the baseline is a feature of the system 100. In some embodiments, handwriting recognition module 112 uses three tangents to confirm statistically the evidence for the baseline estimated via mutual tangent pairs. That is, the three tangents are used to determine that two bi-tangent pairs are collinear. Bi-tangent pairs determine the baseline, collinear triples confirm the baseline. Collinear triples are also valuable in determining which stroke segments are on the baseline, and which are not, i.e., those that are descenders. For cursive script, baseline estimates are made on all but three characters 'fjz' which do not have tangents to the baseline.

As handwriting recognition module 112 estimates the baseline, the tangents can be used to determine the tilt, namely, whether the handwriting is sloped upward as shown in FIG. 6 or downward as shown in FIG. 7. It is recognized that over the course of writing the tilt of the writing may change between upward, downward, and level. This change is reflected in the change of the slope of the mutual tangents.

It is noted that the baseline and tilt constitute the extrinsic geometry. The waistline, ascender line, descender line, and the caps line are really part of the intrinsic geometry, since they are all estimated relative to the baseline and tilt. These features are described in this sub-section because these are strongly related to the baseline and tilt estimation.

A waistline is a local line for the upper point of the top (y-max) of the lower case characters cursive writing (E.g., characters that contain a waist component are abcdeghijkm-nopqrsuvwxyz (all but flt)) A waistline is a useful construct. In typography, waistlines vary among characters; It is likely that many writers do not make these distinctions. It is also likely that there are three different waistlines corresponding to separate classes of waist characters. Separate waistline estimates are stored for separate character classes.

In some embodiments, handwriting recognition module 112 estimates the waistline as parallel to the baseline. Only a single tangent may be used for waistline because the waistline is parallel to the baseline. For accuracy, baseline and waistline are estimated by averaging by robust regression over a semi-local sample of sub-characters (e.g., about 10-15) samples (moving window.) Waistline estimates are made on all characters but the characters 'fit', which do not have tangents at the waistline.

An ascender line is a line for the upper point of the lower case characters that extend above the waistline (e.g., the letters bdfhklt). Handwriting recognition module 112 determines the ascender height by determining the distance between the baseline and the maximum point of the ascender stroke segments. A descender line is a line for the lower point of the lower case characters that extend below the baseline (e.g., the letters fgjpqyz). Handwriting recognition module 112 determines the descender depth by determining the distance between the baseline and the minimum point of the descender stroke segments. Handwriting recognition module 112 determines the relative heights of characters from the baseline, waistline, the ascender line and the descender line.

For block caps letters, handwriting recognition module 112 determines a caps line from the top of the uppercase letters. The caps line may be different from the ascender line.

Extrinsic Geometry Determination Flowchart

Figure 8:
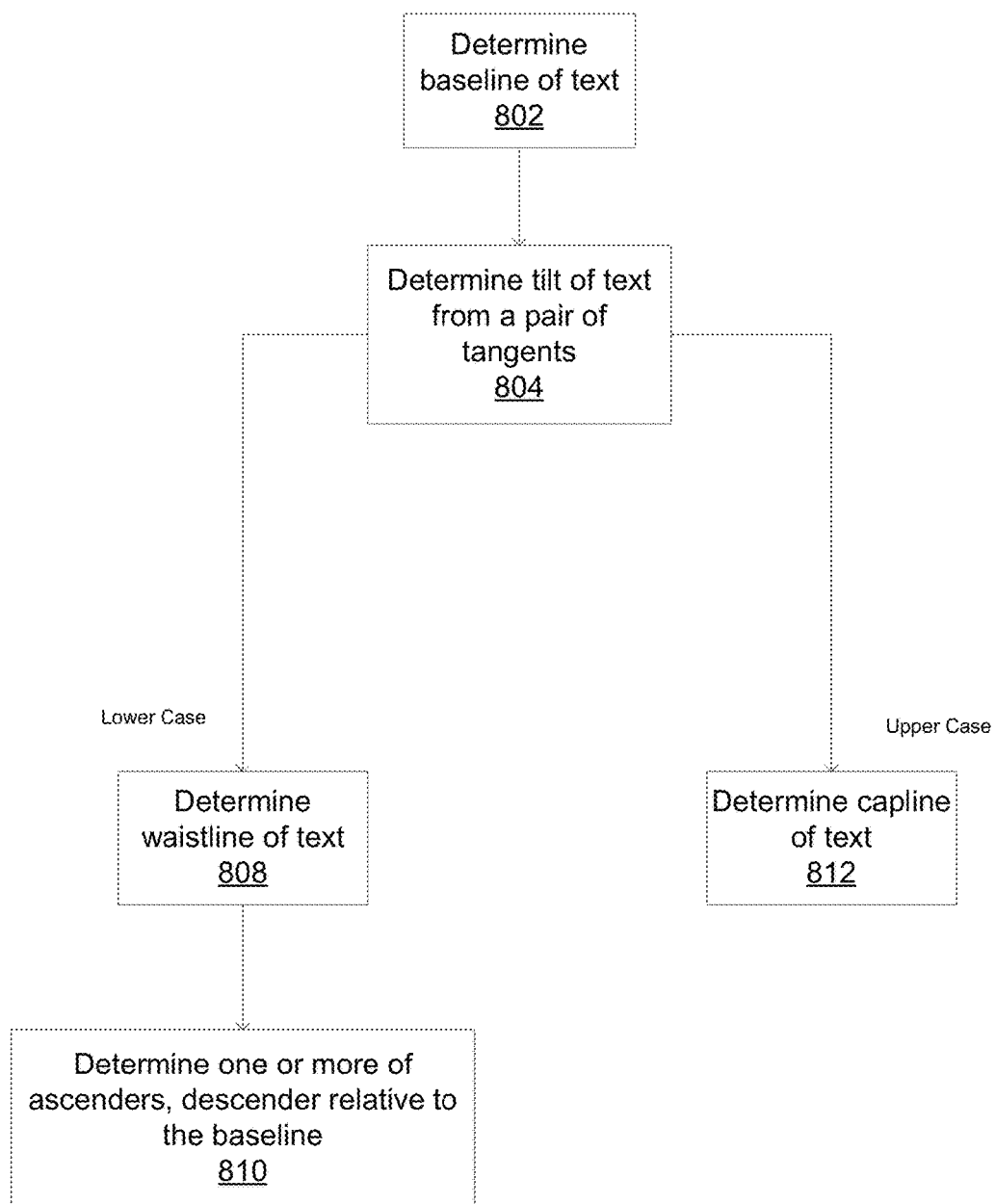
FIG. 8 is a flowchart illustrating a process flow of determining geometric data in handwriting data according to some embodiments.

FIG. 8 is a flowchart illustrating a process flow 800 of determining extrinsic geometric data in handwriting data according to some embodiments. Process flow 800 may be implemented as the determining geometric data in handwriting data at 1204 (see FIG. 12). The geometric data may be the external geometry of the characters.

At 802, handwriting recognition module 112 determines baseline of text of the received handwriting data via mutual tangents and collinear triples. At 804, handwriting recognition module 112 determines the tilt of the text from these mutual tangents. For lower case writing, the waistline of the text of the received handwriting data is estimated at 808. Further, at 810, the positions of the ascenders and descenders are determined with respect to the baseline. For upper case writing, the capsline of the text is determined at 812.

Intrinsic Geometry: Characters, Sub-characters, stroke segments, splines, representation Upon determining the extrinsic geometric data of the text, handwriting recognition system 102 may determine the intrinsic geometry (characters and sub-characters) of text at 1206 (see FIG. 12).

Intrinsic Geometry is the geometry independent of the extrinsic geometry. Intrinsic geometry refers to the structure of a character independent of where it is located in the document, i.e., shape, approximately a similarity in mathematics. Characters are composed of sub-characters (sub-structures).

These sub-character models also largely support models of symbols and of multi-script, non-roman script.

Handwriting recognition module 112 also estimates character slant. Character slant is a property of the shape and hence intrinsic geometry. Slant is the angle of the writing with respect to the vertical of the document. Equivalently, slant is the angle of writing with respect to the baseline.

Slant is estimated based on the local estimate of skew (shear) of circles, and straight lines (A straight line is a circle). Slant is the angle of skew at ymid, or at xmin, or ymax or at ymin. These are equivalent for circles, and approximately equivalent for writing.

Slant estimates the map from vertical to skew for ovals and sticks, i.e., circular arcs. For ovals 'o', slant maps the line from the maximum y-coordinate (ymax) to the minimum y-coordinate (ymin) to the vertical or the angle at the middle y-coordinate (y-mid). For sticks, slant maps a segment about the middle y-coordinate (y-mid) to vertical, (e.g., a stick is an arc of a circle).

For lower case handwriting, the character classes are based on sub-characters, i.e., balls, sticks, ascenders, descenders, and ligatures. The character classes are not intended as a partition (disjoint sets) but to describe commonalities i.e., sharing of parts. For example, a character may be described by two classes, like the letter b' that is composed of an ascender stick and a lobe at the waist.

In some embodiments, for handprint lower case, sticks are from waist or ascender to base or descender; balls are from waist to base or from base to waist. Cursive characters add ligatures that connect characters from base, descender or waist to waist or ascender.

Block caps characters have two levels and a variable intermediate level. Components have full height (D) or are stacked half height (B). There are variations and refinements for typographic reasons.

Sub-characters can be curves (1-dimensional) or pairs of curves (areas, two-dimensional). A pair of curves forms an area. For example, character 'T' can be thought of being composed to two sub-character curves—a vertical line (stick) and a horizontal line (bar). The character 'V' is thought of an area that's closed at the base end and open at the top. Two curves (straight lines in the case of the character 'V') bound the area.

In an illustrative embodiment of Roman script, the sub-characters are "sticks" and "balls." These terms are informal, used for convenience. The terms sub-character, part, and component, are equivalent. The handwriting characters are structures of sticks and balls, which are approximately straight stroke segments that are one-dimensional curves, and approximately circular stroke segments that are two-dimensional areas. In some embodiments, sub-characters model 224 comprises stick sub-characters 232 and ball characters 234. Sub-characters 224 are described in more detail in conjunction with FIG. 9.

The handwriting characters further include added bars, dots, crosses, hooks, and diacritics. The bars may be the horizontal line of the letter "t" for example. The dots may be the dots of the lowercase letter "i" or the lowercase letter "j." For example, the diacritics may be for the umlaut of a German language character, such as the letter a.

In one embodiment, the class of balls includes O C U 3 h among others, the class of closed balls includes O, and the class of partially closed balls, also called balls or lobes, xlobes and ylobes, which are closed at one end or side and open at other end or side (closed top open bottom, closed left open right etc.). Balls bounded by stroke segments predominantly in the horizontal direction ('x') are called xlobes, for example the non-stick parts of 'D', 'E', or 'B'. Similarly, ylobes are bounded by vertical ('y') stroke segments, for example, the non-bar part of 'A' and the non-stick parts of 'n' or 'u'. Partially closed balls include, for example, open right (e.g., "C"), open top (e.g., "U"), open left (e.g., "3"), and open bottom (e.g., "h").

FIG. 9 is a diagram illustrating Roman script sub-characters 224 according to some embodiments.

Stick sub-characters 232 comprise stick singleton sub-characters 902 and stick pair sub-characters 904. Roman script sub-characters 224 further comprises hook sub-characters 908, dot sub-characters 910, cross sub-characters 912, ascender sub-characters 914, and descender sub-characters 916. Example letters and numbers are shown in FIG. 9. Ball sub-characters 234 comprise oval sub-characters 942, x-lobe sub-characters 944, y-lobe sub-characters 946, and x-lobe pair stacked sub-characters 948.

In some embodiments, symbols approximately comprise the same parts of FIG. 9 with appropriate combinations, i.e., #, $ In general, character models block 202 stores a set of hierarchical physical models of characters that is a decomposition of characters into shared sub-character parts and non-shared sub-character parts, formed of, for example, y-stroke segments and x-stroke segments between y-extrema and x-extrema, stroke segment pairs of y-strokes and x-strokes, pairs of stroke pairs, and bars. The decomposition is based on the motions of writing. The shared parts form the basis for character classes. In some embodiments, the model includes geometry and geometry of text and characters for multiple scripts based on a geometric modeling scheme that enables representation of a wide range of scripts as simple hierarchical, part/whole, structured, decompositions into basic observable geometric elements.

Character models 202 comprise a plurality of script models 212. In this example, two script models 212, namely, a Roman script model 212-1, an Arabic script model 212-2, and a Hindi script model 212-3 are shown, but character models 202 may include other script models 212, such as Hiragana or Katakana (Japanese alphabetic scripts).

Roman script model 212-1 comprises character models 222 and sub-character models 224. Sub-character models 224 includes sub-character constructs. Character model 222 includes character classes that are derived from sub-characters. Characters may be represented as classes of shared sub-character constructs and parts that cover the characters of the alphabet or multi-scripts.

In some embodiments, the number of character classes is sufficiently few to simplify the models, but sufficient to enable structured measurement and recognition. The character classes define parameters, and thus the accuracy of the accurate measurements. The character classes help identify structure of extreme variants in the handwriting.

Segmentation, Function approximation, spline representation etc.

There are two paradigms for approximating functions of handwriting data. One paradigm is approximating a function f(x) over a fixed support (a range of 'x' is called support) by additive functions that are specially designed. Examples of this paradigm are Fourier and wavelet decompositions, Legendre-Sobolev decompositions or other orthogonal functions (collectively Generalized Fourier decompositions).

The other paradigm that may be used is segmented, i.e., piecewise. The pieces approximate the data locally. They are concatenated as splines to approximate the data function. In our system, we use a basis of circles and spirals that are not functions of 'x' or 'y' (cartesian coordinates). Curves are more general than functions. Functions are single valued, while curves can and do have multiple values.

In some embodiments, stroke segments, sub-characters, and characters are represented as splines. Splines are curves that are piecewise smooth. The pieces of splines are joined at knots. Curvatures and tangents of a pair of curves are matched at knots. The pieces of splines have varying smoothness at the knots. The pieces of splines may be continuous (connected, C0 continuity), or may be continuous with continuous tangent (C1), or may be continuous with continuous tangent and curvature (C2). Free knots are knots that are determined by data to enable good approximation to the data. These choices are dictated by the data. Handwriting stroke segments are typically two or three pieces only, i.e. only two or three pieces suffice to approximate the strokes. Handwriting is composed of curves, i.e. circles and spirals, which are not functions. Circles and spirals approximate handwriting well, better than parabolas (second order functions). To support circles and spirals, curves are parameterized by arc length (arc length is the cumulative distance along the curves of the character) with a spiral basis and free knots. FIG. 4 shows the spline representation for a character 'u'. 422 represents a pair of continuous splines with C2 continuity, and 424 represents pairs of discontinous splines with C0 continuity.

Our choice of using splines parameterized by arc length with a spiral basis and free knots is intended to improve approximation of handwritten data. The knots are chosen by segmentation to improve approximation. By contrast, most other systems do not segment consistently in the interest of computational simplicity.

Typically splines look like a vertical stick (character 'I'), or a 'C' or 'O'.

Handwriting recognition module 112 segments the blended strokes at identifiable transitions into stroke segments and estimates parameters of separated stroke segments over their support. Splines, which may be piecewise, segmented curves, enable estimation of parameters of curves to be made as insensitive as possible to adjacent stroke segments and to be stratified.

Free knots join spline segments where handwriting recognition module 112 estimates transitions. Handwriting recognition module 112 estimates empirical curves based on curvature peaks, for example, using zero crossings of the first derivative of curvature, dk/ds, called the jerk. Empirical curves such as these, based on the local mean and local discontinuities, are related to the Empirical Mode Decomposition based on the Hilbert-Huang transform based on the supremum envelope and the infimum envelope. See, Hilbert-Huang transform and its applications, NE Huang (2014).

Character Models

Referring again to FIG. 2, probability distributions data store 204 stores the probabilities of sub-characters. Estimation block 126 calculates probabilities that a block of text is composed of various characters over the character path based on the log probability distributions from probability distributions data store 204. It is usual in much of Artificial Intelligence (AI) and statistics to work with the logarithm (log) of probabilities because addition of log probabilities is equivalent to the product of probabilities—which is correct for independent parameters. Thus, the log probabilities are the aggregate of log probabilities over the sub-character parts. As has been described, parts are geometrical objects, and stroke segments define the sub-character and character boundaries, for example, left boundaries, right boundaries, tops (e.g., waistlines, caplines or ascender lines, which are described above), and bottoms (e.g., baselines or descender lines which are described above). The probabilities may include probabilities of stroke segments that include the effects of previous and following stroke segments. More accurate probabilities enable more accurate recognition.

Handwriting input data store 206 stores the input handwriting data that may be digitized in an (x,y) coordinate system for positional data. As described below, handwriting recognition module 112 determines geometric data from the input handwriting data. The geometric data includes the stroke segments of characters in the data and tangent vector, curvature, and positional data (x, y position in this example).

Analyzed text data store 210 stores the text data that has been analyzed and recognized from the handwriting data stored in handwriting input data store 206. The recognized data may be stored, for example, as American Standard Code for Information Interchange (ASCII) or Unicode text.

Lexicon database 211 stores dictionaries, morphology rules of word structure, and associations between words (e.g., the words "intellectual" and "property") for recognizing text. In some embodiments, handwriting recognition module 112 determines whether candidate recognized words are in the lexicon database 211 based on comparison to the candidate word by itself or in context of the text, such as based on grammar or associations with other words. In some embodiments, data storage 114 does not include a lexicon database 211.

Character Separation

Presenting whole, separated characters is not routinely done in handwriting recognition, typically presented as word recognition or over segmented characters (multiple segmentations per character).

In this system, accurate segmentation is routine. Characters have 1 downstroke or 2 downstrokes (or 3 downstrokes, only m). As a start, if handwriting recognition system 102 separates all downstrokes, only about a third of connections are made. Connected downstrokes are made from stick and ball, thin-fat, or ball and stick, fat-thin, connections. Characters "bovw" are balls closed by upstrokes with ligature at waist. Xreverse associated with those characters provides redundant estimate of character boundary. All characters and numerals are 1 ylobe (ball) width, except the letter "m," the letter "w," the letter "M" and the letter "W". Even these characters are regarded as 1 ylobe width, the ylobe defined by LB, RB (left boundary, right boundary, respectively). Ligatures have a single cover over the intercharacter space, emphasized by the ink density, i.e., projection of ink in the slant direction on a line parallel to the baseline, e.g., projection at ymid, midway between the baseline and waistline.

Handwriting recognition system 102 determines the left boundary (LB) by these relations, i.e. by projection in the slant direction of xmin of downstroke 1.

Handwriting recognition system 102 determines the right boundary (RB) by xmax of the right boundary which is downstroke 2 except for the letter "m" and characters "bovw" which are closed by upstrokes with ligature at the waist. For 'bovw' the right boundary is the upstroke of the ball (the second ball for w).

Character separation is described further below in conjunction with FIG. 13.

Probability Computation

Figure 10:
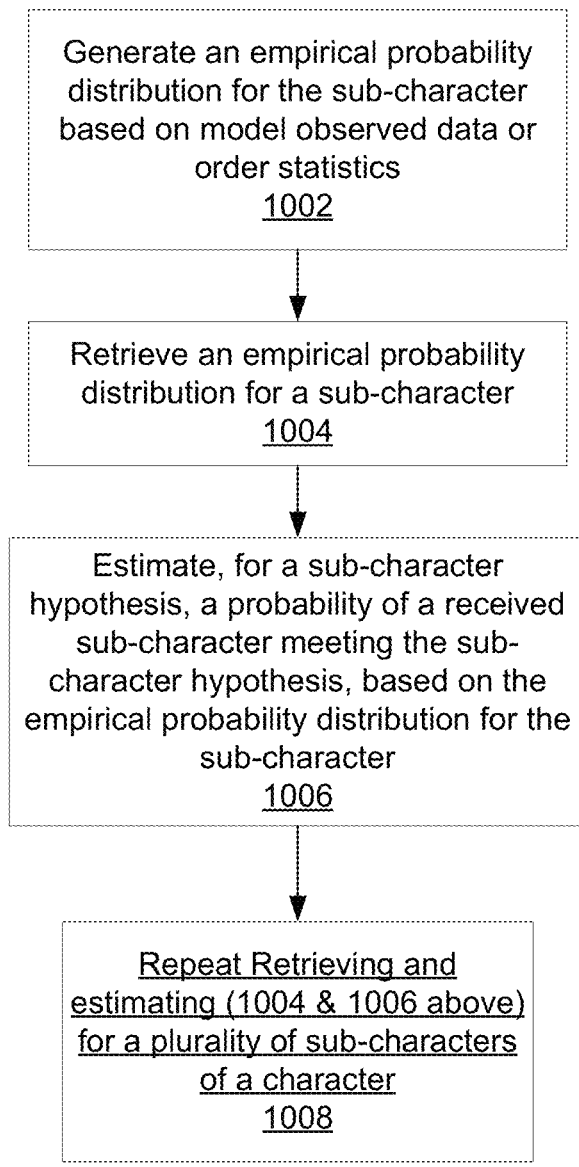
FIG. 10 is a flowchart illustrating a process flow of calculating probabilities of sub-characters of text according to some embodiments.

FIG. 10 is a flowchart illustrating a process flow 1000 of calculating probabilities of sub-characters of text according to some embodiments. Process flow 1000 may be implemented as the matching sub-characters of text to a model at 1208 (see FIG. 12).

At 1002, handwriting recognition module 112 generates an empirical probability distribution for the sub-character based on observed data and order statistics. Handwriting recognition module 112 stores the empirical probability distribution for the sub-character in probability distributions data store 204. Handwriting recognition module 112 may generate the empirical probability distribution for the sub-character by estimating probability of stroke segments based on handwriting models implemented as spline segments; and estimating probability of stroke segment pairs based on handwriting models implemented as spline segments.

At 1004, handwriting recognition module 112 retrieves an empirical probability distribution for a sub-character model. At 1006, handwriting recognition module 112 estimates, for a sub-character hypothesis, a probability of a received sub-character instance meeting the sub-character model, based on the empirical probability distribution for the sub-character. In some embodiments, estimating, for a sub-character hypothesis, a probability of a received sub-character meeting the sub-character hypothesis includes estimating the probability of a pair or tuple of received characters based on sub-word linguistic evidence. In some embodiments, the sub-word linguistic evidence includes phonetic feasibility, linguistic evidence of graphemes, syllables and subsyllables, affixes, bigrams, and trigrams, partially independent from lexical probability.

At 1008, handwriting recognition module 112 repeats the retrieving at 1004 and the estimating, at 1006, for a plurality of sub-characters of a character.

Probabilities of sub-characters of the text may comprise determining, for each sub-character, probability of a sub-character matching a model; and determining joint probabilities of a character based on the determined probability of a sub-character matching a model. Determining most probable characters of the text based on the matching may include determining most probable characters of the text based on the joint probabilities.

Recognition, Subwords, and Adaptation:

The character graph defines a set of character hypotheses with probabilities estimated based on their geometry, using orthographic evidence.

In some embodiments, graph block 124 is a directed acyclic graph (DAG) that is used to calculate the probability of character hypotheses and subword hypotheses. By traversing the graph 208, estimation block 126 can determine the best hypothesis and certainty obtained from the probabilities of comparative hypotheses.

Figure 11:
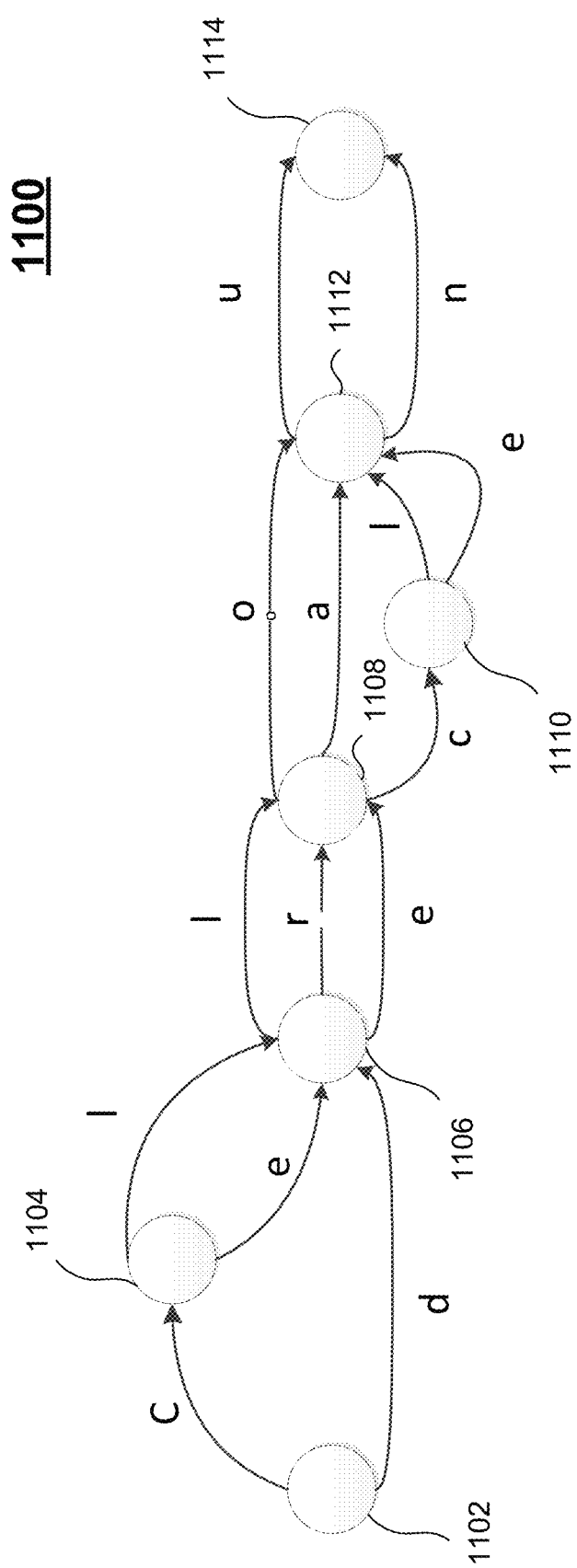
FIG. 11 is a diagram illustrating an example graph according to some embodiments.

FIG. 11 is a diagram illustrating an example graph 1100 according to some embodiments. It shows the character hypotheses for a handwritten word 'Clean' arranged on a directed acyclic graph (DAG). At 1102, the system 100 generates a hypothesis that the first received character is a partially closed ball forming the letter 'c' or is a ball and stick forming the letter 'd.' At 1104, the system 100 generates a hypothesis that the second received character is a stick forming the letter '1' or it is not a second character, but rather the letter 'e.' At 1106, the system 100 generates a hypothesis that the next character is a stick forming the letter '1', a stick forming the letter 'r' or a ball forming the letter 'e.' At 1108, the system 100 generates a hypothesis that the character is a ball forming the letter 'o', a ball forming the letter 'a' or a ball forming the letter 'c.' As part of the latter hypothesis that the character is the letter 'c,' at 1110, the system 100 generates a hypothesis that the character is a stick forming the letter '1' or the ball is not the letter 'c' but is the letter 'e.'. At 1112, the system 100 generates a hypothesis that the character forms the letter 'u' or the letter 'n.' At 1114, the system 100 generates a hypothesis that the word is "Clean" or "dean" and determines the most likely word. The determination may be adjusted based on context. For example, if the word is the first word in a sentence, then it is likely capitalized, and thus the more likely word is "Clean." On the other hand, if the word is elsewhere in a sentence, then context may determine the more likely choice is 'dean.'

Typically less than 10% of the character slots have alternative hypotheses (competitive) while less than 1% have missing hypotheses (false negatives).

In some embodiments, the system 100 combines the orthographic probabilities estimated from geometry with an estimate of the probabilities of linguistic components, subwords, i.e. graphemes, syllable components—onsets and rimes, and affixes. Subwords provide an opportunity for subgraph orthographic evidence and co-articulation resolution.

The resulting character graph defines a set of character probabilities that are used in a standard search of the lexicon using edit distance.

In various embodiments, handwriting recognition system 102 optimizes recognition based on optimizing average delta log probability between true and false hypotheses. Optimization of the delta log probability may be based on parameter selection, parameter estimation, and adaptation to varied handwriting.

Optimization of recognition may depend on optimizing the odds of the correct hypothesis compared to false hypotheses, optimizing the delta log probability. Probability of true hypothesis and false hypotheses may depend on parameters and accurate estimates of those parameters. The estimates may depend on adaptation to widely varying writing. Handwriting recognition module 112 may adapt to a writer, which may increase the accuracy of the estimation of probability. Handwriting recognition module 112 may adapt quickly to a writer and parameters in a new document in only a few characters based on character representations for stratification.

Handwriting has high variability (i.e., handwriting depends strongly on the current document, on the writer, and on the previous and next characters, i.e., handwriting is 'nonstationary'). In various embodiments, character models 202 include models that are built from estimates of geometric parameters, such as height, width, and loop width. Although character models 202 may include models that are built from parameter averages over all writers and all variables, these averages are over broad parameter ranges and probabilities are correspondingly low, and thus, such models do not discriminate (or recognize) well between character hypotheses. Probabilities averaged over writers do not estimate true highly variable probabilities well. Characters that are highly likely for one writer are unlikely for another writer.

To provide parameter probability, handwriting recognition system 102 describes what it has seen or expects to see.

In some embodiments, probability distributions data store 204 includes adaptive probability databases with extensive grouping into classes, sub-grouping into strata, separated sample sets, stratified by writer, character, ligature, sub-character, previous character, and parameter. Handwriting recognition module 112 may group and normalize similar samples. Handwriting recognition module 112 may identify probabilities of similar individual sub-characters. Handwriting recognition module 112 may approximate probabilities in parameter spaces by methods of approximation theory, including peaks for typical styles. In some embodiments, handwriting recognition module 112 includes variants that are expected to be seen as likely geometric variations of strokes, but for which no instances have yet been observed.

The handwriting recognition system 100 uses the current document as source of truth to adapt to the writer of the current document. Handwriting recognition module 112 may use estimates of sub-characters from the beginning of the current document to the current location. Handwriting recognition module 112 uses currently completed characters and sub-characters that have been recognized with high confidence as truth for the remaining portion of the document. The adaptation of handwriting recognition module 112 may depend on character classes based on character models 202 and variants based on analytic models parameterized from data.

In both an offline scenario with forms, with a new writer each document, and an online scenario with one writer on a device, handwriting recognition system 102 may quickly adapt to each writer for usability.

The system 100 does not assume stationary data in order to achieve adaptive recognition.

Handwriting recognition module 112 may include writer-adaptive recognition by representing variants by variations in parts, representing variant characters as separate paths through the Bayesian network of graph block 124.

Handwriting recognition system 100 may rapidly adapt to a writer, within a document, with a small amount of data (e.g., about 5 words). Handwriting recognition system 100 may be suitable for a cell phone user who has little patience for learning how to train the cell phone to his writing. In an application of reading data from handwritten forms, handwriting recognition system 100 has most likely not seen writing of the author of the entered text in the form and the amount of data is usually not large (e.g., 150 to 200 characters). Handwriting recognition system 100 may adapt based on the writing in the form. Handwriting recognition system 100 may adapt to variations of writers over time, from minutes for a document to years for a lifetime.

System Flowchart

Figure 12:
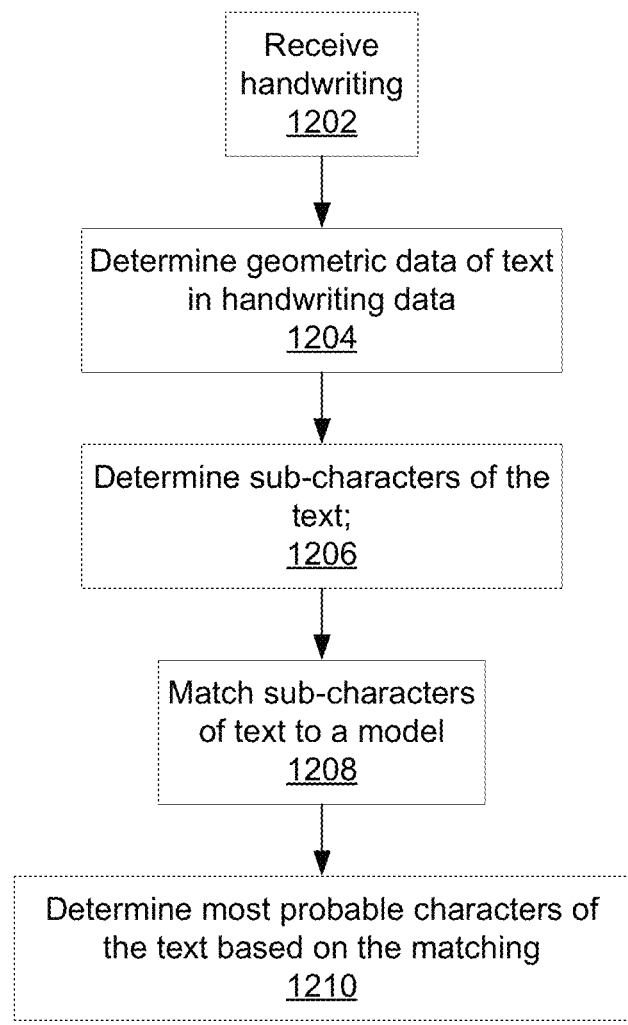
FIG. 12 is a flowchart illustrating a process flow of a handwriting recognition system according to some embodiments.

FIG. 12 is a flowchart illustrating a process flow 1200 of a handwriting recognition system 100 according to one embodiment.

At 1202, handwriting recognition system 102 receives handwriting data from input device 104. The handwriting data may be received online, such as time signals from a digitizing device, or offline, such as images scanned from text on paper or in photos as described above.

At 1204, handwriting recognition system 102 determines geometric data of text in the handwriting data. The determining of geometric data of text may include, for example, determining external geometry of text. In some embodiments, determining geometric data in handwriting data comprises estimating baseline of text and tilt from line segments that are estimated tangent to pairs of y-infima of character strokes; estimating waistline, ascender lines, and descender lines from baseline in lower case text or block caps text waistline of text; and estimating capsline. In some embodiments, determining geometric data in handwriting data comprises determining baseline of text; determining waistline of text; determining capsline of text; and determining one or more of ascenders, descenders, slant angle of text relative to the baseline, and boundary of characters in text.

At 1206, handwriting recognition system 102 determines sub-characters of the text. The determining sub-characters of the text may include, for example, determining internal geometry of text. In some embodiments, determining internal geometry of text includes determining segmentation of sub-characters; and determining spiral spline approximation. In some embodiments, determining internal geometry of text includes determining sub-characters based on ovals, loops, stick, and lobes.

In some embodiments, determining sub-characters of the texts comprises separating strokes from sequences of blended strokes. In some embodiments, the sequences of blended strokes average about 16 single strokes per word for cursive writing. This limits the complexity of parts (sub-characters) and to perform variance reduction of parameters of parts by accurately estimating support of strokes and pairs of strokes.

In some embodiments, the method further comprises separate strokes pairwise at natural transitions based on the parts or components of the model-based representation. In some embodiments, the parts are strokes and stroke pairs, y-strokes, x-strokes, fat y-pairs (ylobes), fat x-pairs (xlobes). This is the intrinsic geometry known informally as balls and sticks, as ovals, loops, retraces, and lobes. Segmentation is made at suprema of absolute curvature between quasi-global pairs of infima of absolute curvature (separated by approximate stroke height.)

At 1208, handwriting recognition system 102 matches sub-characters of text to a model, such as character models 202. The matching sub-characters of text to a model at 1208 may be based on stroke segment probability. Stroke segment probability is based on curve probability, also called functional probability. Stroke segment probability represents the probability of two stroke segments matching under specified conditions. Stroke segments are curves specified as functions of arc length s. Character log probabilities are sums of stroke segment and stroke segment pair log probabilities. Parameters are local to components, i.e., stroke segments or pairs of stroke segments, describing geometric properties.

In some embodiments, the model includes co-articulation of characters, the pair of preceding character and current character and the pair of current character with next character to make use of that orthographic evidence. In some embodiments, the model includes shared sub-character parts. This sharing reduces the model complexity, program complexity, computational complexity and the number of combinations in matching.

In some embodiments, matching at 1208 includes calculating probabilities of sub-characters of the text. In some embodiments, matching at 1208 includes calculating probabilities of curve matching; and calculating probabilities of curve pairs. In some embodiments, matching at 1208 includes determining the probability of matching by representing the probability of matching as a nonparametric probability, and the empirical probability used is based on order statistics.

In some embodiments, matching at 1208 includes mapping sub-characters of text to a model. This mapping may include, for example, mapping the model to character instances by curves, pairs of curves, and pairs of pairs of curves, using signed distance, functional distance that is not scalar, empirical probability that is not parameterized over stratified sub-characters and stratified characters. These properties of probability estimation are used for character recognition.

In some embodiments, matching sub-characters of text to a model comprises estimating empirical conditional probability P(d|h) of parameter data based on a hypothesis from order statistics of the parameter.

At 1210, handwriting recognition system 102 determines the most probable characters of the text based on the matching. In some embodiments, handwriting recognition system 102 determines, at 1210, the most probable characters of the text based on the matching begins after handwriting recognition system 102 determines, at 1204 geometric data of two characters of the text. In one embodiment, determining most probable characters of the text based on said matching begins after initialization, i.e. after determining geometric data of about two characters of the text. After that, each character is reported when it is written in an online mode. At the completion of the document, a re-evaluation of the writing is made based on adaptation to the complete document (in batch mode). In some embodiments, determining the most probable characters of the text based on said matching comprises includes recognizing characters based on generic recognition and not template based recognition.

In some embodiments, determining most probable characters of the text based on said matching comprises estimating character probabilities from k-best graph search (A*) of the DAG of alternative sub-character (part) log probabilities of multiple character hypotheses. This search finds hypotheses with best estimated probabilities. This has effect in maintaining high recognition rate with moderate computational complexity.

Illustrative Classification Example

FIG. 13 is a diagram illustrating a classification of a word 1300 according to some embodiments. In this example, the word 1300 is the block capitals word "QUICK". As part of the determination of geometric data of text in the handwriting data at 1204 (see FIG. 12 above), the handwriting recognition system 102 determines the extrinsic and intrinsic geometry of the data. In this example, word 1300 comprises a plurality of characters 1302-1 through 1302-5 that are, for this example, the upper case letters "Q", "U", "I", "C", and "K" respectively.

When handwriting recognition system 102 receives word 1300, handwriting recognition system 102 has not yet determined that word 1300 is the word "QUICK". Handwriting recognition system 102 determines a left boundary 1322, a right boundary 1324, a baseline 1382, and a capsline 1384 for each character of word 1300. For clarity and simplicity, a left boundary 1322, a right boundary 1324, a baseline 1382, and capsline 1384 are not shown for all characters 1302.

In this example, handwriting recognition system 102 determines the left boundary 1322-1, the right boundary 1324-1, the baseline 1382 (not shown for character 1302-1), and the Capsline 1384 (not shown) for the character 1302-1. Handwriting recognition system 102 determines that character 1302-1 is a closed ball and includes a stroke that crosses the closed ball. At this time, handwriting recognition system 102 may not yet have determined that character 1302-1 is the upper case letter "Q". Such determination is performed, such as by the graph process described in conjunction with FIG. 11.

In this example, handwriting recognition system 102 analyzes the second character 1302-2 and determines the left boundary 1322-2, the right boundary 1324-2, the baseline 1382 (not shown for character 1302-2), and the capsline 1384 (not shown) for the character 1302-2. Handwriting recognition system 102 determines that character 1302-2 is a ball having an open top. At this time, handwriting recognition system 102 may not yet have determined that character 1302-2 is the uppercase letter U. Such determination is made, such as by the graph process described in conjunction with FIG. 11.

In this example, handwriting recognition system 102 analyzes the third character 1302-3 and determines the left boundary 1322, the right boundary 1324, the baseline 1382, and the capsline 1384 (not shown) for the character 1302-3. Handwriting recognition system 102 determines that character 1302-3 is a stick. At this time, handwriting recognition system 102 may not yet have determined that character 1302-3 is the uppercase letter "I". Such determination is made, such as by the graph process described in conjunction with FIG. 11.

In this example, handwriting recognition system 102 analyzes the fourth character 1302-4 and determines the left boundary 1322 (not shown), the right boundary 1324 (not shown), the baseline 1382-4, and the Capsline 1384-4 for the character 1302-4. Handwriting recognition system 102 determines that character 1302-4 is a ball having an open right side. At this time, handwriting recognition system 102 may not yet have determined that character 1302-4 is the uppercase character "C". Such determination is made, such as by the graph process described in conjunction with FIG. 11.

In this example, handwriting recognition system 102 analyzes the fifth character 1302-5 and determines the left boundary 1322 (not shown), the right boundary 1324 (not shown), the baseline 1382-5, and the capsline 1384-5 for the character 1302-5. Handwriting recognition system 102 determines that character 1302-5 is a stick and a ball having an open right side. At this time, handwriting recognition system 102 may not yet have determined that character 1302-5 is the uppercase character "K". Such determination is made, such as by the graph process described in conjunction with FIG. 11.

The Left Boundary (LB) 1322-1 is the line in the slant direction through xmin of downstroke 1 of the oval Q. In this case, the slant direction is vertical. Slant is frequently vertical for block caps. A similar LB 1322-1 exists for C and K (not shown). The slant for cursive is typically −20 degrees (FIG. 7). For the letters 't','h', 'l' the LB 1322-1 is in the slant direction (described above) through x min of the characters. The LB is the same for 'e', 'c', 'n','o', and 'y' in that figure.

The right boundary (RB) 1324-1 is generated by the line in the slant direction nominally through xmax of downstroke 2 for 2 ud characters. 'b', 'o', 'v',' and lud pair characters ('c','e','f','I','j','l','r','s','t') do not have a second downstroke. The RB 1324-1 of some block caps have two xsuprema, e.g. K or X. The RB and character width measurement are a compromise of the two.

All publications, patents, and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems The present invention also relates to an apparatus for performing the operations herein. This apparatus may be specially constructed for the required purposes, or it may comprise a general-purpose computer selectively activated or reconfigured by a computer program stored in the computer. Furthermore, the computers referred to in the specification may include a single processor or may be architectures employing multiple processor designs for increased computing capability. The apparatus, methods, and techniques described above may be implemented as a computer program (software) executing on a cell phone, or on one or more other computers. For example, a cell phone may have several cores (CPUs) and tens of graphic processors (GPUs). The computer program may further be stored on a tangible non-transitory computer readable medium, such as a memory or disk, for example. A computer readable medium may include instructions for performing the processes described below and character data described below. In the description herein, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for recognizing handwriting, the method comprising:
    receiving handwriting data;
    determining geometric data of text in handwriting data;
    determining sub-characters of the text;
    matching sub-characters of text to a model; and
    determining most probable characters of the text based on said matching,
    wherein the matching sub-characters of text to a model comprises:
    estimating empirical conditional probability P(d|h) of parameter data based on hypothesis from order statistics of a parameter;
    using signed functional distance that is not scalar; and
    estimating non-parameterized empirical probability over stratified character and sub-character populations.

* * * * *